United States Patent
Hale et al.

(10) Patent No.: US 12,480,089 B2
(45) Date of Patent: Nov. 25, 2025

(54) ANTIVIRAL TREATMENT COMPRISING BLIS CONTAINING PROBIOTIC PRODUCTS

(71) Applicant: BLIS TECHNOLOGIES LIMITED, Dunedin (NZ)

(72) Inventors: John David Francis Hale, Dunedin (NZ); John Robert Tagg, Dunedin (NZ)

(73) Assignee: BLIS TECHNOLOGIES LIMITED, Dunedin (NL)

( * ) Notice: Subject to any disclaimer, the term of this patent is extended or adjusted under 35 U.S.C. 154(b) by 608 days.

(21) Appl. No.: 17/916,421

(22) PCT Filed: Mar. 31, 2021

(86) PCT No.: PCT/NZ2021/050054
§ 371 (c)(1),
(2) Date: Sep. 30, 2022

(87) PCT Pub. No.: WO2021/201699
PCT Pub. Date: Jul. 10, 2021

(65) Prior Publication Data
US 2023/0303964 A1    Sep. 28, 2023

(30) Foreign Application Priority Data

Apr. 3, 2020   (NZ) ......................................... 763188
Jun. 15, 2020  (NZ) ......................................... 765345

(51) Int. Cl.
| | |
|---|---|
| *A61K 39/02* | (2006.01) |
| *A61K 31/4706* | (2006.01) |
| *A61K 38/12* | (2006.01) |
| *A61K 38/14* | (2006.01) |
| *A61K 45/06* | (2006.01) |
| *A61P 11/00* | (2006.01) |
| *A61P 31/16* | (2006.01) |
| *C12N 1/20* | (2006.01) |
| *C12R 1/46* | (2006.01) |

(52) U.S. Cl.
CPC .......... *C12N 1/205* (2021.05); *A61K 31/4706* (2013.01); *A61K 38/12* (2013.01); *A61K 38/14* (2013.01); *A61K 45/06* (2013.01); *A61P 11/00* (2018.01); *A61P 31/16* (2018.01); *C12R 2001/46* (2021.05)

(58) Field of Classification Search
None
See application file for complete search history.

(56) References Cited

FOREIGN PATENT DOCUMENTS

| | | |
|---|---|---|
| EP | 0247873 A2 | 12/1987 |
| WO | 2004/072272 A1 | 8/2004 |
| WO | 2009/059054 A2 | 5/2009 |
| WO | 2011/125086 A1 | 10/2011 |
| WO | 2021/201699 A1 | 10/2021 |

OTHER PUBLICATIONS

Kaci et al (Applied and Environmental Microbiology p. 928 -934 Feb. 2014 vol. 80 No. 3; 928-934).*
Author Unknown, "Blis Travel Protect with BLISK12 (Vanilla) 10 pre travel and 20 maintenance," NZ Health Store, [retrieved on Feb. 13, 2020] 1 page. Retrieved from: http://www.nzhealthstore.co.nz/shop/Childrens+Health/Blis+Travel+Protect+with+BLISK12+Vanilla+16+lozenges.html.
Author Unknown, "Blis Probiotics / Products", Blis Probiotics, [retrieved on Jun. 18, 2021] 3 pages. Retrieved from: http://blisprobiotics.com.au/product/travelprotect-travel-immune-booster/.
PCT/NZ2021/050054, International Search Report and Written Opinion mailed Jun. 18, 2021, 12 pages.
Di Pierro, et al., "Positive clinical outcomes derived from using *Streptococcus salivarius* K12 to prevent streptococcal pharyngotonsillitis in children: a pilot investigation" Drug, Healthcare and Patient Safety, vol. 8, pp. 77-81. Nov. 21, 2016.
Wescombe, et al., "Developing oral probiotics from *Streptococcus salivarius*." Future Microbiology vol. 7(12), p. 1355-1371. 2012.
Dr. Ken Harvey "Complaint to TGA: Blis Probiotics", https://www.medreach.com.au/wp-content/uploads/2020/09/Complaint-to-TGA-Bliss-Probiotics.pdf, Sep. 6, 2020, Web. 21 pages.
Accessed Sep. 30, 2022. Amazon webpage. Amazon.com: Customer reviews: BLIS TravelProtect with High Potency BLIS K12, 2.5 Billion CFU Oral Probiotic to Support Your Throat Health Immunity While Travelling or Flying, Sugar-Free, 24 Lozenges. 5 pages.
Di Pierro, et al., "The administration of *S. salivarius* K12 to children may reduce the rate of SARS-CoV-2 infection", Edizioni Minerva Medica, Aug. 2021, 112(4):514-516, 3 pages.
Di Pierro, et al., "Clinical Effects of *Streptococcus salivarius* K12 in Hospitalized COVID-19 Patients: Results of a Preliminary Study", MDPI, Microorganisms, Aug. 27, 2022, 10(10) 1926, 13 pages.

* cited by examiner

Primary Examiner — Jennifer E Graser
(74) *Attorney, Agent, or Firm* — Kilpatrick Townsend & Stockton LLP

(57) ABSTRACT

This invention relates to methods of prophylactically or therapeutically treating viral infections particularly in the lower respiratory tract. Treatment of coronavirus infections is particularly contemplated. The invention also relates to the use of BLIS-producing *Streptococcus* strains, extracts and exudates thereof, and compositions containing same in the prevention, reduction, or treatment of such virus infections.

22 Claims, 1 Drawing Sheet
Specification includes a Sequence Listing.

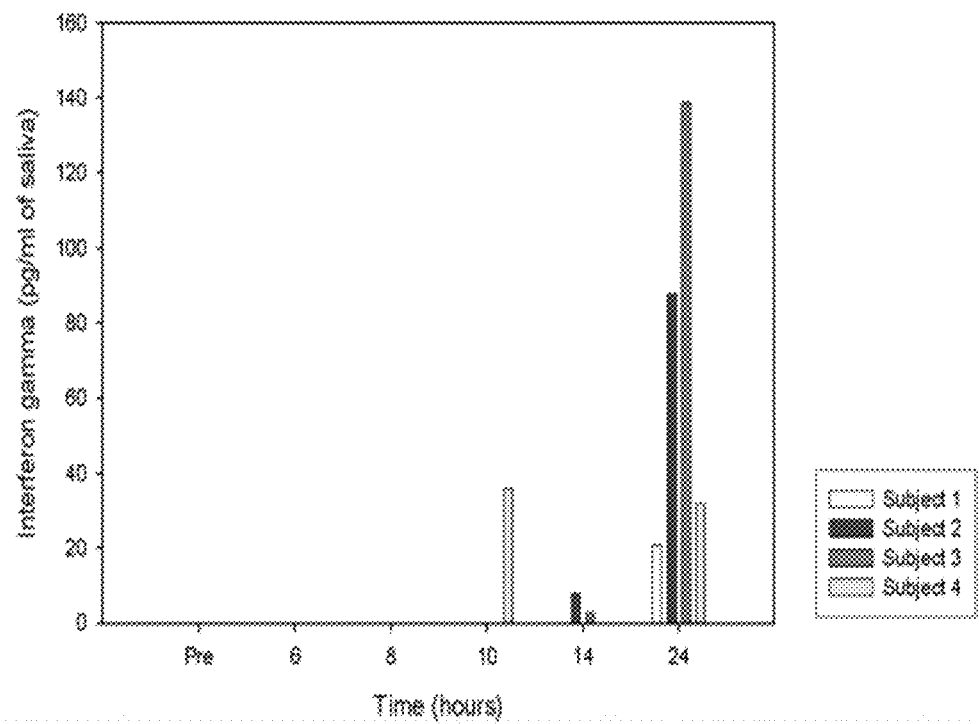

SEQUENCE LISTING

```
<160> NUMBER OF SEQ ID NOS: 8

<210> SEQ ID NO 1
<211> LENGTH: 48
<212> TYPE: PRT
<213> ORGANISM: Streptococcus salivarius

<400> SEQUENCE: 1

Met Lys Asn Ser Lys Asp Ile Leu Asn Asn Ala Ile Glu Glu Val Ser
1               5                   10                  15

Glu Lys Glu Leu Met Glu Val Ala Gly Gly Lys Arg Gly Ser Gly Trp
            20                  25                  30

Ile Ala Thr Ile Thr Asp Asp Cys Pro Asn Ser Val Phe Val Cys Cys
        35                  40                  45

<210> SEQ ID NO 2
<211> LENGTH: 156
<212> TYPE: DNA
<213> ORGANISM: Streptococcus salivarius

<400> SEQUENCE: 2
atgaatgcca tgaaaaactc aaaagatatt ttgaacaatg ctatcgaaga agtttctgaa       60
aaagaactta tggaagtagc tggtggtaaa agaggttcag gttggattgc aactattact      120
gatgactgtc caaactcagt attcgtttgt tgttaa                                156

<210> SEQ ID NO 3
<211> LENGTH: 48
<212> TYPE: PRT
<213> ORGANISM: Streptococcus salivarius
```

-continued

<400> SEQUENCE: 3

Met Lys Asn Ser Lys Asp Ile Leu Thr Asn Ala Ile Glu Glu Val Ser
1               5                   10                  15

Glu Lys Glu Leu Met Glu Val Ala Gly Gly Lys Lys Gly Ser Gly Trp
            20                  25                  30

Phe Ala Thr Ile Thr Asp Asp Cys Pro Asn Ser Val Phe Val Cys Cys
        35                  40                  45

<210> SEQ ID NO 4
<211> LENGTH: 156
<212> TYPE: DNA
<213> ORGANISM: Streptococcus salivarius

<400> SEQUENCE: 4
atgagtttta tgaaaaattc aaaggatatt ttgactaatg ctatcgaaga agtttctgaa      60
aaagaactta tggaagtagc tggtggtaaa aaaggttcag gttggtttgc aactattact     120
gatgactgtc cgaactcagt atttgtttgt tgttaa                               156

<210> SEQ ID NO 5
<211> LENGTH: 156
<212> TYPE: DNA
<213> ORGANISM: Streptococcus salivarius

<400> SEQUENCE: 5
atgattgcca tgaaaaactc aaaagatatt ttgaacaatg ctatcgaaga agtttctgaa      60
aaagaactta tggaagtagc tggtggtaaa agaggtacag gttggtttgc aactattact     120
gatgactgtc caaactcagt attcgtttgt tgttaa                               156

<210> SEQ ID NO 6
<211> LENGTH: 51
<212> TYPE: PRT
<213> ORGANISM: Streptococcus salivarius

<400> SEQUENCE: 6

Met Ile Ala Met Lys Asn Ser Lys Asp Ile Leu Asn Asn Ala Ile Glu
1               5                   10                  15

Glu Val Ser Glu Lys Glu Leu Met Glu Val Ala Gly Gly Lys Arg Gly
            20                  25                  30

Thr Gly Trp Phe Ala Thr Ile Thr Asp Asp Cys Pro Asn Ser Val Phe
        35                  40                  45

Val Cys Cys
    50

<210> SEQ ID NO 7
<211> LENGTH: 114
<212> TYPE: DNA
<213> ORGANISM: Streptococcus salivarius

<400> SEQUENCE: 7
ttgactcttg aagaacttga taacgttctt ggtgctggtg gtggagtaat ccaaaccatt      60
tcacacgaat gtcgtatgaa ctcatggcag ttcttgttta cttgttgctc ttaa           114

<210> SEQ ID NO 8
<211> LENGTH: 37
<212> TYPE: PRT
<213> ORGANISM: Streptococcus salivarius

<400> SEQUENCE: 8

```
-continued

Leu Thr Leu Glu Glu Leu Asp Asn Val Leu Gly Ala Gly Gly Gly Val
1               5                   10                  15

Ile Gln Thr Ile Ser His Glu Cys Arg Met Asn Ser Trp Gln Phe Leu
                20              25                  30

Phe Thr Cys Cys Ser
            35
```

ANTIVIRAL TREATMENT COMPRISING BLIS CONTAINING PROBIOTIC PRODUCTS

CROSS REFERENCE TO RELATED APPLICATIONS

This application is a 371 National Stage filing of PCT Application No. PCT/NZ2021/050054, filed Mar. 31, 2021, which claims the benefit of priority to New Zealand Patent Application No. 763188, filed Apr. 30, 2020 and New Zealand Patent Application No. 765345, filed Jun. 15, 2020, the contents of which are hereby incorporated by reference in their entirety for all purposes.

FIELD OF THE INVENTION

This invention relates to methods of prophylactically or therapeutically treating viral infections particularly in the lower respiratory tract. Treatment of coronavirus infections is particularly contemplated. The invention also relates to the use of BLIS-producing *Streptococcus* strains, extracts thereof, and compositions containing same in the prevention, reduction, or treatment of such virus infections.

BACKGROUND

Viral infections account for significant morbidity and mortality in humans and animals. Although significant resources have been dedicated to identifying compounds having anti-viral properties, viral infections continue to present a significant risk to human and animal health. Viral infections result in work absences, reduced productivity, financial loss, and broader economic effects. During the 2015-2016 flu season in the US, the cost for hospitalization and out-patient visits was estimated at $10.4 billion. The health and economic toll for the SARS-CoV-2 (2019) virus will not be assessed for several years.

In addition, the usefulness of most existing anti-viral treatments is limited by the development of multidrug resistance, poor efficacy, and/or toxicity. Many anti-viral treatments are toxic and can cause serious side effects, including heart damage, kidney failure and osteoporosis. Other challenges include creating a drug that is broadly applicable in combating many different types of viral infections, which can be particularly important in the treatment of immunocompromised individuals.

Accordingly, there is a general need for new antiviral treatments which address one or more of these desiderata; and or which at least provide the public with a useful choice.

Seven viruses have been considered to be the usual causes for lower respiratory tract (LRT) infection. These include respiratory syncytial virus (RSV); influenza A and B; parainfluenza 1, 2, and 3; and adenovirus. In the past decade, a number of new viruses associated with lower respiratory tract infections have been identified, including human metapneumovirus (hMPV), severe acute respiratory syndrome coronavirus, human coronaviruses, parainfluenza 4, and bocavirus.

Of these viruses, coronaviruses are a group of single-stranded RNA viruses that cause a range of diseases in animals and birds. In chickens, coronaviruses cause upper respiratory tract infections. In cows and pigs, they are known to cause diarrhoea. In humans, coronaviruses primarily cause respiratory tract, and enteric infections. Up to 15% of common cold cases are thought to be caused by coronaviruses.

Coronaviruses have been responsible for many large, economically and physically damaging disease outbreaks in birds, pigs, and humans. Human coronaviruses identified in outbreaks in recent years include SARS-CoV (2003), HCoV NL63 (2004), HKU1 (2005), MERS-CoV (2012), and SARS-CoV-2 (2019). In some outbreaks, fatalities can be over 10% of cases, although most patients do recover. Individuals with underlying health conditions such as diabetes, heart disease, or those that are immunocompromised, are particularly susceptible.

Human respiratory coronaviruses act in a similar manner, by binding to lung cells via the ACE-2 receptors. They multiply rapidly in the lung cells before being secreted. The virus is spread to others primarily through close contact with respiratory droplets generated when sneezing or coughing.

SARS-CoV-2 has spread rapidly around the world. Accordingly, there is an urgent and ongoing need for agents and methods which may be useful in the prevention, reduction or treatment of coronavirus and other LRT infections. It is an object of the present invention to go some way to meeting this need; and/or to at least provide the public with a useful choice.

Other objects of the invention may become apparent from the following description which is given by way of example only.

Any discussion of documents, acts, materials, devices, articles, or the like which has been included in the present specification is solely for the purpose of providing a context for the present invention. It is not to be taken as an admission that any or all of these matters form part of the prior art base or were common general knowledge in the field relevant to the present invention as it existed before the priority date.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

In WO 01/27143 *S. salivarius* strains are identified which have utility in the treatment and prevention of infections of the upper respiratory tract caused by streptococcal organisms, including sore throats caused mainly by *S. pyogenes*, and dental caries caused at least in part by *S. sobrinus*. Treatment is primarily through administration of the probiotics to the oral cavity. No activity was recorded against any lower respiratory tract viruses. Di Pierro et al; *Drug Healthc Patient Saf.* 2016 Nov. 21; 8:77-81, reports that Blis K12 in addition to its beneficial effects against streptococcal disease, may have a role in children in reduction of nonstreptococcal diseases, including tracheitis, viral pharyngitis, rhinitis, flu, laryngitis, acute otitis media, and enteritis. Di Pierro et al; Drug Healthc Patient Saf 6, 15-20 2014 Feb. 13 eCollection 2014 suggests a role for Blis K12 in treating viral pharyngotonsillitis. No direct antiviral activity is demonstrated for Blis K12, nor is any activity recorded against coronavirus, or RSV in either paper.

The present invention is broadly directed to methods of prophylactic or therapeutic treatment of lower respiratory tract (LRT) virus infections using a Blis product; and/or to methods which at least provide the public with a useful choice.

SUMMARY OF THE INVENTION

Accordingly, in one aspect, the invention relates to a method for the prophylactic or therapeutic treatment of a lower respiratory tract (LRT) virus infection in a patient in need thereof, the method comprising administering to said patient an effective amount of a Blis product.

In another aspect, the invention relates to a method for at least inhibiting the growth of an LRT virus sensitive to a Blis product, the method comprising contacting the LRT virus with a Blis product.

In some embodiments, the LRT virus is selected from the group consisting of: influenza A, influenza B, respiratory syncytial virus (RSV), and coronavirus. In some embodiments, the LRT is influenza A H1N1 (eg A/CA/07/2009) or H3N2. In some embodiments, the LRT virus is influenza B Brisbane/60/2008. In some embodiments, the LRT virus is RSV A2.

In some embodiments, the LRT virus causing the infection binds to the ACE2 receptors on cells of said patient. In some embodiments, the virus is a coronavirus (e.g., SARS-CoV (2003), HCoV NL63 (2004), HKU1 (2005), MERS-CoV (2012), and SARS-CoV-2 (2019) and variants thereof). In some embodiments, the virus is SARS-CoV-2 and/or variants thereof.

In some embodiments, a high dose of *S. salivarius* is administered to said patient 1 to 4 times a day.

In another aspect, the invention relates to use of a Blis product, in the manufacture of a medicament for the prophylactic or therapeutic treatment of an LRT virus infection in a patient in need thereof.

In another aspect, the invention relates to use of a Blis product in the manufacture of a composition for at least inhibiting the growth of an LRT virus sensitive to a Blis product.

In some embodiments, the Blis product is selected from *S. salivarius* strains K12, M18, DC0010A, Glasgow 3, exudates of, extracts thereof, and supernatants thereof.

In some embodiments, the Blis product is in the form of a composition which further comprises a pharmaceutically acceptable diluent, carrier and/or excipient. In some embodiments, the composition is in the form of an inhalable composition, spray, nasal spray, lozenge, gum, capsule, powder, melt, food product (egyoghurt, frozen yoghurt, ice cream), confectionary (eg gummy, or candy), or chewable. In some embodiments, the composition is in a form for administration via an inhaler, nebuliser, or atomiser.

In some embodiments, the composition is in unit dosage form.

In some embodiments, the method further comprises administering one or more other active agents. In some embodiments, the other active agent(s) are selected from antibodies, vaccines, immune modulators, probiotics, antimalarial compounds, antiviral compounds, antibiotic compounds, anti-inflammatory compounds and polymerase inhibitors. In some embodiments, the antibody is selected from bamlanivimab, casirivimab, etesevimab, VIR 7831, REGEN-COV and imdevimab, and combinations thereof. In some embodiments, the vaccine is selected from the vaccine is selected from the Pfizer/bioNtech, Oxford-AstraZeneca, Moderna, and Johnson & Johnson SARS CoV-2 vaccines. In some embodiments, the immune modulator is selected from budesonide (inhaled). AZD7422, azithromycin, doxycycline, tocilizumab, sarilumab, canakinumab, anakinra, baricitinib, ruxolitinib, acalabrutinib, brensocatib, ravulizumab, gemtuzumab ozogamicin, namilumab, infliximab, adalimumab, otilimab, Medi3506, leronlimab, risankizumab, lenzilumab, and IMU-838. Probiotics can include cells and/or their extracellular products. In some embodiments, the antimalarial compound is selected from chloroquine and hydroxychloroquine. In some embodiments, the antiviral compound is selected from lopinavir, ritonavir or a combination thereof. In some embodiments, the antibiotic compound is selected from the group consisting of amikacin, amoxicillin, ampicillin, azithromycin, carbenicillin, cefotaxime, ceftazidime, ceftriaxone, cefuroxime, chloramphenicol, ciprofloxacin, clindamycin, dalacin, dalfopristin, daptomycin, doxycycline, enrofloxacin, ertapenem, erythromycin, gentamicin, marbofloxacin, meropenem, metronidazole, minocycline, moxifloxacin, nafcillin, ofloxacin, oxacillin, penicillin, quinupristin, rifampin, silver sulfadiazine, sulfamethoxazole, teicoplanin, tetracycline, tobramycin, trimethoprim, vancomycin, bacitracin and polymyxin B, or a mixture thereof. In some embodiments, the anti-inflammatory compound is selected from steroids (preferably dexamethasone), immunoglobulin, cytokine blockers, and JAK inhibitors. In some embodiments, the polymerase inhibitor is selected from remdesivir, galidesivir and favipiravir.

In another aspect, the invention relates to a Blis product, for use in the prophylactic or therapeutic treatment of an LRT virus infection in a patient in need thereof.

In another aspect, the invention relates to a Blis product for use in at least inhibiting the growth of an LRT virus sensitive to a Blis product.

The viruses and strains for the uses, compositions and products for uses above can be the same as those stated for the methods above.

In another aspect, the invention relates to a biologically pure culture of *S. salivarius* strain DC0010A, on deposit at NMI, Australia, accession No. V20/014481.

In another aspect, the invention relates to a biologically pure culture of *S. salivarius* strain Glasgow3, on deposit at NMI, Australia, accession No. V20/014483.

In another aspect, the invention relates to an antiviral composition comprising the above *S. salivarius* strain Glasgow3 or DC0010A, and an acceptable carrier, diluent and/or excipient.

In another aspect, the invention relates to a therapeutic composition comprising the above *S. salivarius* strain Glasgow3 or DC0010A. In some embodiments the composition further comprises a pharmaceutically acceptable carrier, diluent and/or excipient.

Although the invention is broadly as described above, it will be appreciated by those persons skilled in the art that the invention is not limited thereto but also includes embodiments of which the following description gives examples. In particular, the invention will be described in relation to the accompanying drawings.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The present invention will be described with reference to the accompanying figures, in which:

FIG. 1 is a bar graph showing interferon gamma levels in saliva following ingestion of *S. salivarius* K12.

DETAILED DESCRIPTION OF THE INVENTION

Definitions

The term "Blis product" as used herein refers to BLIS-producing *S. salivarius*, BLIS-containing *S. salivarius* supernatants, cell extracts, or cell exudates, or naturally-released extracellular products thereof, including extracellular products such as salivaricins in isolated or purified form, and compositions comprising said *S. salivarius*, supernatants, extracellular products, cell extracts or cell exudates thereof. In one embodiment, the Blis product is a salivaricin product including an *S. salivarius* producing same, or a salivaricin-containing cellular extract or supernatant of said *S. salivarius*. A Blis product can also include combinations of *S. salivarius*, supernatants, extracellular products, cell exudates, cell extracts, and isolated or purified salivaricins.

When a salivaricin or salivaricin polypeptide is referred to, the term also encompasses functionally equivalent variants. Such variants can be identified as discussed herein. Typical variants have at least 70% sequence identity with salivaricin sequences herein, and function as salivaricins.

The term "patient" as used herein refers to an animal undergoing treatment, and does not indicate the presence of an LRT virus infection. Treatment can be prophylactic, to prevent or reduce the likelihood or severity of LRT virus infections such as a coronavirus infection. Prophylactic treatment or treatment can also be provided to reduce the duration of symptomatic disease or infectivity. Treatment can also be provided to an infected patient to decrease the severity of, or to reduce or eliminate an LRT virus infection, or its associated symptoms. The patient may be a human or another animal. Non-human patients include livestock such as cows, pigs, and chickens; and domestic animals such as dogs and cats. The Blis product, including *S. salivarius* strains, can be administered to the patient at any age, e.g. childhood, adolescence, adulthood, or elderly. Where an "individual" or "host" is referred to it is synonymous with the term "patient".

The term "lower respiratory tract" as used herein means the trachea, bronchi, and lungs. The term is contrasted with the "upper respiratory tract" which means nose, nasal passages, and nasopharynx.

The term an "effective amount" as used herein refers to an amount sufficient to provide a beneficial effect to a patient. Such beneficial effects may include detectable: increase in IFN-γ, reduction in NF-kB-mediated cytokine response in the lungs, inhibition of viral replication, and/or decrease in viral load. The effect should be sufficient to provide a medically significant decrease in the likelihood of an LRT virus infection, or a medically significant decrease in the severity, or length of an LRT virus infection, or associated symptoms, or secondary infections. For non-medical uses an "effective amount" may be an amount sufficient to inhibit or reduce viral activity in vitro.

Associated symptoms will vary depending on the viral infection. For example, in the case of RSV, symptoms may include: dry cough, sore throat, fever, runny nose, sneezing and congestion.

In the case of coronavirus, associated symptoms may include: fever, cough, myalgia or fatigue, sputum production, headache, haemoptysis and diarrhoea. Dyspnoea and lymphopenia are common. In severe cases patients may also exhibit acute respiratory distress syndrome, RNAemia, acute cardiac injury, lung damage and pneumonia.

Influenza A and B can cause mild to severe illness, and can even result in death. Associated symptoms may include fever, chills, cough, sore throat, runny or stuffy nose, body aches, headache, fatigue, nausea, and diarrhea.

Common secondary infections with respiratory tract infections are caused by bacteria including *Streptococcus pneumoniae, Haemophilus influenzae*, and *Staphylococcus aureus*, amongst others.

The term "comprising" as used in this specification and claims means "consisting at least in part of". When interpreting each statement in this specification and claims that includes the term "comprising", features other than that or those prefaced by the term may also be present. Related terms such as "comprise", "comprised" and "comprises" are to be interpreted in the same manner.

As used herein the term "and/or" means "and" or "or", or both.

As used herein "(s)" following a noun means the plural and/or singular forms of the noun.

The general chemical and biological terms used, for example, in the formulae and sequences herein have their usual meanings.

As noted above, the present invention is directed in one aspect to a method for at least inhibiting the growth of a LRT virus sensitive to a Blis product. The method comprises contacting the sensitive LRT virus with an inhibitory effective amount of a Blis product.

The phrase "inhibiting the growth of an LRT virus sensitive to a Blis product" as used herein refers to the growth inhibition of at least one or more LRT virus sensitive to a BLIS-producing *S. salivarius* strains. Inhibition of growth may be determined by a variety of methods but can include the Virus Yield Reduction Assay (VYR), observation of cytopathic effect or virucidal assays.

The term "contacting" as used herein refers to both direct and indirect contact between the LRT virus or its receptor and a Blis product. Indirect contact comprises exposure of the LRT virus or its receptor in its environment, particularly native environment, to a Blis product.

The LRT virus to be treated may be on a wide range of surfaces, including environmental, and contact surfaces such as food preparation surfaces (eg chopping boards), handles, doors, and lift buttons.

However, the native environment for LRT viruses is within an animal host, and more particularly in the host cells. In some embodiments contacting in this context may comprise contacting the LRT virus directly with a Blis product. Direct contact may inactivate the virus or prevent binding of the virus to a cellular receptor. In some embodiments contacting in this context may comprise inclusion of a Blis product in the vicinity of the LRT virus cellular receptor. Indirect contact may provide an alternative (decoy) binding site for the LRT virus, reducing the amount of virus which is bound to a host cell. In this way the overall LRT viral infection, or rate of infection may be reduced.

In another embodiment the invention therefor relates to methods of prophylactically or therapeutically treating a LRT virus infection with a Blis product as set out above. In some embodiments, the Blis product reduces viral activity/infection at least 15, 20, 25, or more fold compared to an untreated infection.

In some embodiments when the Blis product is an *S. salivarius* K12 product, an *S. salivarius* M18 product, an *S. salivarius* DC0010A product, an *S. salivarius* Glasgow 3 product, or a combination thereof, the product has an anti-coronavirus SI value for Vero(egVero 76), cells infected with Sars-Cov-2 of SI greater than 4, 5, 6, 7, 8, 9, 10, 11, 12, 13, 14, 15, 16, 17, 18, 19, 20 or 21. In some embodiments the SI value is in the range 7 to 30, or 8 to 25, or 10 to 21, or 10 to 49.9.

In some embodiments when the Blis product is *S. salivarius* strain K12, the viral infection is not rhinitis, flu, pharyngitis, laryngitis, tracheitis, or enteritis.

LRT viruses which may be treated according to the methods of the invention include respiratory syncytial virus (RSV); influenza A and B; parainfluenza 1, 2, and 3 and 4; adenovirus, human metapneumovirus (hMPV), coronaviruses, and bocavirus. In some embodiments, the LRT is influenza A or influenza B. In some embodiments, the virus is selected from influenza A, influenza B, and respiratory syncytial virus (RSV). In some embodiments, the influenza A strain is selected from H1N1 (eg A/CA/07/2009) and H3N2. In some embodiments, the influenza B strain is Brisbane/60/2008. In some embodiments, the RSV strain is A2.

In some embodiments the coronavirus is a human coronavirus. For example, human coronavirus 229E, human coronavirus OC43, SARS-CoV, HCoV NL63, HKU1, MERS-CoV, SARS-CoV-2 (Covid-19), or a variant thereof. The invention is particularly useful for the treatment of SARS-CoV-2 (Covid-19) and/or variants thereof.

In some embodiments, a Blis product is used to treat or prevent an LRT in an adult or elderly patient.

A range of *S. salivarius* strains suitable for use in the Blis product of the invention are known in the art.

*Streptococcus* salivaricin-producing strains K12, K30, M18, Glasgow 3, and DC0010A are producers of salivaricins, including salivaricins A and B. Salivaricin BLIS-producing strains with activity against viruses include K12, and K30 both deposited with Deutche Sammlung von Mikroorganismen Und Zellkulturen GmbH, Mascheroder Weg 1 b, D-38124, Braunschweig, Germany on 8 Oct. 1999, and 8 Oct. 1999, and assigned Accession Nos. DSM 13084 and 13085 respectively, and strain Mia (M18) deposited with Deutche Sammlung von Mikroorganismen Und Zellkulturen GmbH, Mascheroder Weg 1 b, D-38124, Braunschweig, Germany on 12 Dec. 2001 and assigned Accession No. DSM 14685.

DC0010A and Glasgow3 are additional *S. salivarius* strains that can be used according to the invention. DC0010A and Glasgow 3 were deposited in National Measurement Institute Laboratories (NMI), Suakin Street, Pymble, New South Wales, Australia on 26 Jun. 2020 according to the Budapest Treaty for the purposes of patent procedure, and were accorded NMI deposit numbers V20/014481 and V20/014483 respectively. Accordingly, in some embodiments, the invention relates to each of *S. salivarius* strains Glasgow3 and DC0010A. These strains are currently exhibiting superior in vitro antiviral activity to K12.

*S salivarius* strains useful herein can be characterised at least in part by P-typing, or determining which salivaricins the strain produces. This is described in Tagg and Bannister (1979) *J. Med. Microbiol.* 12:397. K12 and K30 have a P-type of 777 (see WO01/27143) and Ml 8 has a P-type of 677 P-type on Blood agar+calcium carbonate, and a 777 P-type on Trypticase soy-yeast extract-calcium carbonate agar (see WO2003/070419). DC0010A has a P-type of 624 and Glasgow 3 has a P-type of 634.

In some embodiments the strains may be in isolated form. In some embodiments the strains are in the form of a biologically pure culture. In some embodiments, the invention includes a salivaricin therefrom in isolated or purified form, or an extracellular product, or cell extract, or cell exudate thereof.

In some embodiments of the invention, the Blis product is in the form of BLIS-producing *S. salivarius*. The *S. salivarius* may be in live, attenuated, lyophilised or killed form. Killed forms of probiotics such as *S. salivarius* are known in the art and are sometimes designated "Zombie" probiotics, or "immunobiotics". Zombie probiotics can retain their effectiveness even when not living. That is, the effect of the bacterial cells on the host is independent of the bacterial cell viability. It is based on the capacity of host cells to recognise specific bacterial components or products giving rise to responses that commonly involve the mucosa-associated lymphoid tissue (MALT), and therefore the immune system.

*S. salivarius* for use in control of upper respiratory tract bacterial infections have traditionally been grown under conditions which suppress bacteriocin production so that the *S. salivarius* are not self-toxic. The *S. salivarius* are then commonly formatted as lozenges (chewable tablets), powders or gums or in food products for oral delivery.

In contrast, for use in the lower respiratory tract, *S. salivarius* are grown under conditions which encourage production of bioactive extracellular products such as salivaricins. The higher levels of salivaricins produced may be beneficial in action against viruses in the lower respiratory tract.

*S. salivarius* BLIS-producers may be characterised at least in part by testing potential producer strains in agar surface assays as taught in WO01/27143. Production of salivaricins A, $A_2$ and B may be confirmed by comparing sequence identity and activity to those sequences and activity data given in WO 01/27143. For convenience, the amino acid sequences of salivaricins which may be useful in the invention are as follows:

| Salivaricin | Amino Acid and Nucleic Acid Sequence |
|---|---|
| A | MKNSKDILNNAIEEVSEKELMEVAGG<br>-1<br>KRGSGWIATITDDCPNSVFVCC<br>(SEQ ID NO: 1)<br>+1<br>ATGAATGCCATGAAAAACTCAAAAGATATTTTGAAC<br>AATGCTATCGAAGAAGTTTCTGAAAAAGAACTTATG<br>GAAGTAGCTGGTGGTAAAAGAGGTTCAGGTTGGATT<br>GCAACTATTACTGATGACTGTCCAAACTCAGTATTC<br>GTTTGTTGTTAA (SEQ ID NO: 2) |
| A1 | MKNSKDILTNAIEEVSEKELMEVAGG<br>-1<br>KKGSGWFATITDDCPNSVFVCC<br>(SEQ ID NO: 3)<br>+1<br>ATGAGTTTTATGAAAAATTCAAAGGATATTTTGACT<br>AATGCTATCGAAGAAGTTTCTGAAAAAGAACTTATG<br>GAAGTAGCTGGTGGTAAAAAAGGTTCAGGTTGGTTT<br>GCAACTATTACTGATGACTGTCCGAACTCAGTATTT<br>GTTTGTTGTTAA (SEQ ID NO: 4) |
| A2 | MIAMKNSKDILNNAIEEVSEKELMEVAGG<br>-1<br>KRGTGWFATITDDCPNSVFVCC<br>(SEQ ID NO: 5)<br>+1<br>ATGATTGCCATGAAAAACTCAAAAGATATTTTGAAC<br>AATGCTATCGAAGAAGTTTCTGAAAAAGAACTTATG<br>GAAGTAGCTGGTGGTAAAAGAGGTACAGGTTGGTTT |

| Salivaricin | Amino Acid and Nucleic Acid Sequence |
|---|---|
| | GCAACTATTACTGATGACTGTCCAAACTCAGTATTC GTTTGTTGTTAA (SEQ ID NO: 6) |
| B | LTLEELDNVLGA -1 GGGVIQTISHECRMNSWQFLFTCCS (SEQ ID NO: 7) +1 TTGACTCTTGAAGAACTTGATAACGTTCTTGGTGCT GGTGGTGGAGTAATCCAAACCATTTCACACGAATGT CGTATGAACTCATGGCAGTTCTTGTTTACTTGTTGC TCTTAA( SEQ ID NO: 8) |

The sequence for salivaricin $A_1$ is also given as a further BLIS potentially useful in the invention.

Sequence comparison, e.g., of salivaricins, may be achieved using BLASTP. Typically, different BLIS-producing streptococcal strains carry salivaricins with at least 70%, at least 75%, at least 80% sequence similarity, e.g., at least 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% similarity. Different BLIS-producing streptococcal strains also can carry salivaricins with at least 70%, at least 75%, at least 80% identity, e.g., at least 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% identity.

In some embodiments, similarity and identity may be measured over half, two thirds, three quarters, or over the full length of the salivaricin sequence.

More particularly, polypeptide sequence identity can be determined in the following manner. The subject polypeptide sequence is compared to a candidate polypeptide sequence using BLASTP (from the BLAST suite of programs, version 2.10.1 [June 2020]) in bl2seq, which is publicly available from NCBI (ftp://ftp.ncbi.nih.gov/blast/). The default parameters of bl2seq may be utilized. Polypeptide sequence identity may also be calculated over the entire length of the overlap between a candidate and subject polynucleotide sequences using global sequence alignment programs. EMBOSS-needle (available at http:/www.ebi-.ac.uk/emboss/align/) and GAP (Huang, X. (1994) On Global Sequence Alignment. Computer Applications in the Biosciences 10, 227-235) are also suitable global sequence alignment programs for calculating polypeptide sequence identity.

Use of BLASTP as described above is preferred for use in the determination of polypeptide variants useful in the present invention.

While the BLIS-producing streptococcal strains are known to be active against certain aerobic and anaerobic bacteria, their activity against LRT viruses such as RSV, coronavirus, and SARS-CoV-2 in particular, is unexpected. All the more so, because BLIS-producing organisms are typically known to act against more closely related species of bacteria.

Evidence of the prophylactic and therapeutic activity of S. salivarius K12 against SARS-CoV-2 can be found in DiPierro and Colombo (2021) "The administration of S. salivarius K12 to children may reduce the rate of SARS-CoV-2 infection" Minerva Med. Doi:10.23736/S0026-4806.21.07487-5. The publication is incorporated by reference in its entirety.

The authors studied 128 school aged children over the span of 3 months. Half of the group was treated with Blis K12, while the other half was not. Nearly half of the untreated children tested positive for SARS-CoV-2 infection, while none of the treated children tested positive. This study, while limited, supports the efficacy of using Blis K12 at least, as a preventative or treatment for Sars CoV-2.

These BLIS-producing S. salivarius, are therefore useful as antiviral agents per se as well as therapeutically. In this context, "therapeutic" includes prophylactic treatment. Therapeutic uses include the treatment or prevention of LRT virus infections, particularly RSV, influenza A and B, coronavirus infections, and especially infections by SARS-CoV-2.

Blis products useful in the invention also include extracts and exudates obtainable from the BLIS-producing S. salivarius strains. Extracts include those in which the BLIS or BLIS produced by the S. salivarius strain is/are provided in isolated or pure form. Exudates include fluid preparations which are obtained by freezing then thawing lawn cultures of the S. salivarius. An "isolated" BLIS is one which has been identified and separated and/or recovered from its natural cellular environment. Extracts or exudate can be obtained using known art protocols. An extract can conveniently be obtained by cell culture and collection of a cellular slurry supernatant (bacterial liquor and cells). Additional purification can be carried out, such as removal of cells, e.g., by centrifugation. Centrifugation can be carried out to produce a clarified supernatant (e.g., 5000 g for 10 min). The supernatant can also be concentrated, e.g., using a Speed Vac (e.g., model SVC-100H, Savant Instruments). Routine isolation methods include ammonium sulphate precipitation, column chromatography (e.g. ion exchange, gel filtration, affinity chromatography etc.), electrophoresis, and ultimately, crystallisation (see generally "Enzyme Purification and Related Techniques". Methods in Enzymology, 22: 233-577 (1991)). The BLIS may be purified as necessary using conventional techniques (see for example, Parente, E and Ricciardi, A. Applied Microbiol. Biotechnol 52: 628 (1999)).

BLIS salivaricins may be purified to greater than 95% by weight of BLIS as determined by the Lowry method (Lowry, O. H. et al., 1951. Protein Measurement with Folin-Phenol Reagents. *J Biol. Chem.* 193: 265-275). Preferably the BLIS will be purified to 99% or more by weight.

These active extracts, exudates and supernatants may similarly be used in therapeutic formulations and methods. Extracts include the BLIS bacteriocins salivaricin A, $A_1$, $A_2$ and B, or variants thereof in isolated or pure form. The term "variant" of the bacteriocins polypeptides encompasses naturally occurring, recombinantly and synthetically produced polypeptides. The variants are functionally equivalent in that they exhibit similar antibiotic or antiviral properties to salivaricin A, $A_1$, $A_2$ and B. The bacteriocins A1, A2, and B and variants, together with processes for their production are taught in WO 01/27143 incorporated herein by reference.

Variant polynucleotide and polypeptide sequences refer to polynucleotide or polypeptide sequences different from the specifically identified BLIS bacteriocins or bacteriostatic sequences, wherein one or more nucleotides or amino acid residues is deleted, substituted or added. Variants may be naturally occurring allelic variants, or non-naturally occurring variants. Variants may be from the same or other species and encompasses homologues, paralogues and orthologues. Both cDNA and genomic sequence variants are contemplated. Variant polynucleotide and polypeptide sequences preferably exhibit at least 70%, preferably at least 80%, more preferably at least 90%, more preferably at least 95%, more preferably at least 98%, and most preferably at least 99% identity to a BLIS polynucleotide or polypeptide sequence useful in the present invention. For salivaricins A, A1, A2, and B identity is found over a comparison window of at least 5, 10, 15, preferably at least 18 amino acid positions, more preferably at least 20 amino acid positions, and most preferably over the entire length of a polypeptide.

Sequence identity may be determined as discussed above. Conservative substitutions of one or several amino acids of a described polypeptide sequence without significantly altering its biological activity are also included in the invention. A skilled artisan will be aware of methods for making phenotypically silent amino acid substitutions (see, e.g., Bowie et al., 1990, Science 247, 1306) and WO 01/27143.

The salivaricins and variants useful in the invention can be prepared in a variety of ways. For example, by isolation from a natural source (such as S. salivarius strains K12, K30, M18(Mia), DC0010A, and Glasgow 3); by synthesis using any suitable known techniques (such as is described for nisin synthesis by Wakamiya et al., (1991) in "Nisin and Novel Lantibiotics" ed. G. Jung and H. G Shal, 189-203, Escom, Leiden; or by solid phase synthesis as described by Merrifield (1964) J Am. Chem. Assoc. 85, 2149-2154, or by synthesis in homogeneous solution as described by Houbenwycl (1987), Methods of Organic Chemistry, Vol I and II) or through employing recombinant DNA techniques such as described by Sambrook et al (1989), Molecular cloning: A Laboratory Manual, Cold Spring Harbour Press, New York, USA.

The variants of both native BLIS and its variants can similarly be made by any of those techniques known in the art. For example, variants can be prepared by protein engineering and site-specific mutagenesis of the DNA encoding the native amino acid sequence as described by Adelman et al., DNA 2, 183 (1983), and in Molecular Cloning: a Laboratory Manual, 4th edition, Green & Sambrook, 2012, Cold Spring Harbor Laboratory Press, which is incorporated herein by reference).

The variant sequences, including both polynucleotide and polypeptide variants, may also be identified by computer-based methods well-known to those skilled in the art, using public domain sequence alignment algorithms and sequence similarity search tools to search sequence databases (public domain databases include Genbank, EMBL, Swiss-Prot, PIR and others). See, e.g., Nucleic Acids Res. 29: 1-10 and 11-16, 2001 for examples of online resources. Similarity searches retrieve and align target sequences for comparison with a sequence to be analyzed (i.e., a query sequence). Sequence comparison algorithms use scoring matrices to assign an overall score to each of the alignments.

An exemplary family of programs useful for identifying variants in sequence databases is the BLAST suite of programs (version 2.10.1 [June 2020]) including BLASTN, BLASTP, BLASTX, tBLASTN and tBLASTX, which are publicly available from (ftp://ftp.ncbi.nih.gov/blast/) or from the National Center for Biotechnology Information (NCBI), National Library of Medicine, Building 38A, Room 8N805, Bethesda, MD 20894 USA. The NCBI server also provides the facility to use the programs to screen a number of publicly available sequence databases. BLASTN compares a nucleotide query sequence against a nucleotide sequence database. BLASTP compares an amino acid query sequence against a protein sequence database. BLASTX compares a nucleotide query sequence translated in all reading frames against a protein sequence database. tBLASTN compares a protein query sequence against a nucleotide sequence database dynamically translated in all reading frames. tBLASTX compares the six-frame translations of a nucleotide query sequence against the six-frame translations of a nucleotide sequence database. The BLAST programs may be used with default parameters or the parameters may be altered as required to refine the screen.

The use of the BLAST family of algorithms, including BLASTN, BLASTP, and BLASTX, is described in the publication of Altschul et al., Nucleic Acids Res. 25: 3389-3402, 1997.

The "hits" to one or more database sequences by a queried sequence produced by BLASTN, BLASTP, BLASTX, tBLASTN, tBLASTX, or a similar algorithm, align and identify similar portions of sequences. The hits are arranged in order of the degree of similarity and the length of sequence overlap. Hits to a database sequence generally represent an overlap over only a fraction of the sequence length of the queried sequence.

The BLASTN, BLASTP, BLASTX, tBLASTN and tBLASTX algorithms also produce "Expect" values for alignments. The Expect value (E) indicates the number of hits one can "expect" to see by chance when searching a database of the same size containing random contiguous sequences. The Expect value is used as a significance threshold for determining whether the hit to a database indicates true similarity. For example, an E value of 0.1 assigned to a polynucleotide hit is interpreted as meaning that in a database of the size of the database screened, one might expect to see 0.1 matches over the aligned portion of the sequence with a similar score simply by chance. For sequences having an E value of 0.01 or less over aligned and matched portions, the probability of finding a match by chance in that database is 1% or less using the BLASTN, BLASTP, BLASTX, tBLASTN or tBLASTX algorithm.

Multiple sequence alignments of a group of related sequences can be carried out with CLUSTALW (Thompson, J. D., Higgins, D. G. and Gibson, T. J. (1994) CLUSTALW: improving the sensitivity of progressive multiple sequence alignment through sequence weighting, positions-specific gap penalties and weight matrix choice. Nucleic Acids Research, 22:4673-4680, http://www-igbmc.u-strasbg.fr/Biolnfo/ClustalW/Top.html) or T-COFFEE (Cedric Notredame, Desmond G. Higgins, Jaap Heringa, T-Coffee: A novel method for fast and accurate multiple sequence alignment, J. Mol. Biol. (2000) 302: 205-217)) or PILEUP, which uses progressive, pairwise alignments. (Feng and Doolittle, 1987, J. Mol. Evol. 25, 351).

Pattern recognition software applications are available for finding motifs or signature sequences. For example, MEME (Multiple Em for Motif Elicitation) finds motifs and signature sequences in a set of sequences, and MAST (Motif Alignment and Search Tool) uses these motifs to identify similar or the same motifs in query sequences. The MAST results are provided as a series of alignments with appropriate statistical data and a visual overview of the motifs found. MEME and MAST were developed at the University of California, San Diego.

PROSITE (Bairoch and Bucher, 1994, Nucleic Acids Res. 22, 3583; Hofmann et al., 1999, Nucleic Acids Res. 27, 215) is a method of identifying the functions of uncharacterized proteins translated from genomic or cDNA sequences. The PROSITE database (www.expasy.org/prosite) contains biologically significant patterns and profiles and is designed so that it can be used with appropriate computational tools to assign a new sequence to a known family of proteins or to determine which known domain(s) are present in the sequence (Falquet et al., 2002, Nucleic Acids Res. 30, 235). Prosearch is a tool that can search SWISS-PROT and EMBL databases with a given sequence pattern or signature.

In addition to the computer/database methods described above, polypeptide variants may be identified by physical methods, for example by screening expression libraries using antibodies raised against antibiotic polypeptides used in the invention (Sambrook et al., Molecular Cloning: A Laboratory Manual, 2nd Ed. Cold Spring Harbor Press, 1987) or by identifying polypeptides from natural sources with the aid of such antibodies.

Variant polynucleotides useful herein also or alternately hybridize to the polynucleotide sequences recited above, or complements thereof, antisense sequences and complements thereof, under stringent conditions. As used herein, "stringent conditions" refers to hybridization conditions such as pre-washing in a solution of 6×SSC, 0.2% SDS; hybridizing at 65° C., 6×SSC, 0.2 SDS overnight; followed by two washes of 30 minutes each in 1×SSC, 0.1% SDS at 65° C. and two washes of 30 minutes each in 0.2×SSC, 0.1% SDS at 65° C. Such conditions are discussed more fully in, for example, Sambrook et al., Molecular supra.

The term "variant" when used in the context of an LRT virus should be similarly understood. Most of the LRT viruses which cause infection, are RNA viruses which are prone to mutation. Variants of SARS-CoV-2 are being detected, such as the United Kingdom B1.1.7, South African B.1.351, and Brazilian P.1 variants. SARS-CoV-2 variants typically have at least 80%, at least 85%, at least 90%, at least 95%, at least 96%, at least 97%, at least 98%, or at least 99% sequence identity to one another, or to the originally detected SARS-CoV-2 strain (Kaur et al. (2021) *Infection, Genetics and Evolution* 89:104490). More broadly, SARS-CoV-2 shares a 79% sequence identity with SARS-CoV (Lu et al, Lancet, 395 (10224), 565-574 2020 Feb. 22). The Blis products are believed to be equally useful against such variant LRT viruses.

Recombinant production of a BLIS useful in the invention can be achieved using well known art techniques as taught in WO 01/27143, or for example in the Protein expression handbook; Thermo Fisher Scientific; 2015.

A "therapeutic composition" is a composition appropriate for administration of a Blis product to an individual in need of same, particularly a coronavirus-susceptible individual. In general, therapeutic compositions are composed of a *S. salivarius* strain, exudate, supernatant, or extract discussed above and a pharmaceutically acceptable carrier, diluent and/or excipient.

An "acceptable carrier, diluent and/or excipient" means a vehicle for delivery of a Blis product eg *S. salivarius* strain, salivaricin, exudate, supernatant, or extract, to a surface or a host, in which the vehicle is compatible with bacterial cell viability, or activity of the extract, exudate, supernatant or salivaricin. Acceptable carriers, diluents and excipients suitable for use in the administration of viable *S. salivarius* strains, exudates, supernatants and extracts are well known to those skilled in the art (see, for example, *Remington's Pharmaceutical Sciences*, 22nd ed., Gennaro, ed., 2013, Mack Publishing Co., Easton, Pa.), incorporated herein by reference. Suitable carriers are generally inert and can be either solid or liquid.

In one embodiment, the carrier is a pharmaceutically acceptable carrier. Pharmaceutically acceptable carriers suitable for use with the Blis products, including *S. salivarius* strains herein include, but are not limited to, water, buffered saline solutions (e.g., phosphate-buffered saline), pharmaceutically acceptable culture media (e.g. BACa, CAB+ galactose, TSBCaYE+maltrin agar), or other solutions which maintain the viability of the Blis product including bacterium. Additionally, such pharmaceutically acceptable carriers may be aqueous or non-aqueous solutions, suspensions, and emulsions. A variety of pharmaceutically acceptable carriers suitable for administration of viable or lyophilized bacteria are well known in the art (See for example Remington's supra.); and the pharmaceutical composition LACTINEX™ (Hynson, Westcott and Dunning, Baltimore, Md. USA), a commercially available formulation for oral administration of viable lactobacilli). Suitable solid carriers known in the art include, for example, magnesium carbonate; magnesium stearate; celluloses; talc; sugars such as galactose, maltose; fructose; sucrose; mannitol; lactose; isomalt; starches; flours; oligosaccharides and skim milk, and similar edible powders, but are not limited thereto. Carriers for administration of extracts, exudates, supernatants or salivaricins per se are similarly well known.

Typical diluents, by way of example are: starches; lactose; mannitol; kaolin; calcium phosphate or sulphate; inorganic salts such as sodium chloride; and powdered sugars or celluloses.

The compositions may also include excipients such as resins; fillers; binders; lubricants; solvents; glidants; disintegrants; preservatives; buffers; flavourings; colourings; sweeteners; and fragrances as appropriate.

Typical binders include starch; gelatin; sugars such as lactose, fructose, and glucose; and the like. Natural and synthetic gums are also convenient, including acacia; alginates; locust bean gum; methylcellulose; polyvinylpyrrolidine tragacanth; Xanthan gum; and the like. Polyethylene glycol; ethyl cellulose; and waxes can also serve as binders. A currently preferred binder is Emdex™ (Penwest, NY, USA).

Lubricants to prevent sticking to the die during manufacture include slippery solids such as talc, silica, magnesium and calcium stearate, polyethylene glycol, stearic acid and hydrogenated vegetable oils.

Disintegrators are substances which swell when wetted to break up the composition and release the Blis product, eg *S. salivarius* or extract. The disintegrators include starches; clays; celluloses; algins and gums; more particularly corn and potato starches; methylcellulose; agar; bentonite; wood cellulose; cation exchange resins; alginic acid; guar gum; citrus pulp; carboxymethylcellulose; powdered sponge; and sodium lauryl sulfate.

For delivery to the LRT, the Blis product is commonly in a composition formulated for administration by inhalation. The inhaled product is typically in powdered or micronized powder form, or liquid form. The composition can conveniently be administered using an inhaler, nebuliser, atomiser, or any other recognised device for delivery to the LRT. Carriers for inhalable products are well known in the art and include lactose, erythritol, sorbitol, and cyclodextrin.

The Blis product can also be in a composition formulated for oral administration. For example, the Blis product can be in a lozenge, gum, capsule, spray (eg nasal or mouth spray), drops (eg nasal drops), syrups, mouthwash, gargles, toothpastes, powder, melt, yoghurt, gummy, candy, or chewable.

In some embodiments the composition comprising the Blis product is in the form of a food, confectionery or drink. In some embodiments, the foodstuff or drink may be a dairy product-based food or drink, including by way of example, yoghurt, frozen yoghurt, ice cream, cheese, milk, milk biscuits and flavoured milks. In the case of a confectionery, the composition can be a candy, gummy, or chewing gum such as a chewing gum as described in WO 00/05972.

In some embodiments, freeze-dried strains of salivaricin B-producing *S salivarius* may be included in milk powder formulations in a manner similar to that previously reported for the preparation of Bifidus Milk Powder (Nagawa et al (1988); J Dairy Sci 71: 1777-1782).

In some embodiments, the composition includes *S. salivarius* strains K12, M18, DC0010A, Glasgow 3, or a combination of any two or more strains thereof. See, for example, Mani et al. (2017) *Int J Experiment Dent Sci* 6:6.

The composition can additionally contain nutrients to maintain the viability and enhance the efficacy of the bacterium in the formulation. Further ingredients useful in a Blis product containing composition, are agents that selectively enhance growth of desirable bacteria over non desirable organisms.

In some embodiments, the therapeutic product, antiviral compositions or methods of the invention further comprise the use of other potentiating agents to promote the antiviral activity of a Blis product. In some embodiments, the potentiating agents are selected from carbohydrates, for example, oligosaccharides such as Nutriose® FB (Roquette Freres, Lestrem, France), galactose, maltodextrose, and lactulose; prebiotic agents; chemicals such as reducing agents, for example cysteine and mercaptoethanol; and metal ions such as magnesium.

Blis products can also be formulated to contain flavouring agents, colouring agents, fragrances, or other compounds which increase the appeal of the product to a patient and/or enhance patient compliance without compromising the effectiveness of the product. Methods for preparation of compositions for inhalable administration are well known in the art (see, for example, Remington's Pharmaceutical Sciences, 22nd ed., supra, incorporated herein by reference).

The invention also provides novel *S. salivarius* strains DC0010A and Glasgow 3. Further provided are antiviral compositions comprising such strains. In some embodiments, the antiviral composition further comprises an acceptable carrier, diluent and/or excipient. Also provided are therapeutic compositions comprising such strains. In some embodiments, the therapeutic composition comprises a pharmaceutically acceptable carrier, diluent and/or excipient. The compositions comprising novel strains DC0010A and Glasgow 3 above may be formulated with any of the carrier, diluents, excipients, binders, lubricants, disintegrators, flavourings, colourings, fragrances etc discussed above. The compositions may similarly be formulated for administration in any of the forms discussed above, eg for inhalation or oral administration. For general use against LRT viruses, Blis products may be produced for other methods of administration including topically administrable compositions but not limited thereto. Where surfaces are being treated, the Blis products may be formulated as compositions for application by spraying, dipping, wiping and the like.

The methods of the invention may further comprise the administration of one or more other active agents. These other active agents may, for example, be antibodies, vaccines, immune modulators, probiotics, antimalarial compounds, antiviral compounds, antibiotic compounds, anti-inflammatory compounds, polymerase inhibitors or combinations thereof.

Antibodies useful in the compositions of the invention include antibodies known or being explored for treatment of the LRT viruses herein. In some embodiments, antibodies may be derived from individuals recovered from a virus such as SARS CoV-2. The antibodies may be in the form of plasma containing the antibodies, purified antibodies, or recombinantly produced antibodies.

Antibodies currently in clinical trials for SARS CoV-2 include VIR-7831, REGEN-COV (casirivimab with imdevimab), bamlanivimab and etesevimab. Accordingly, antibody treatments that can be used for coronavirus include bamlanivimab, casirivimab, etesevimab, VIR 7831. REGEN-COV and imdevimab, and combinations thereof.

See, e.g., *Pharmaceutical-Journal.com* "Everything-you-need-to-know-about-the-covid-19-therapy-trials", Robinson (2021) *Pharmaceutical J* (Official Journal of the Royal Pharmaceutical Society, available 26 Mar. 2021 at: "*Pharmaceutical-journal.com/article/feature/everything-you-need-to-know-about-the-covid-19-therapy-trials*>.

A range of LRT vaccines are known, and also being constantly developed. For example, annual influenza vaccines developed in response to prevailing Influenza strains. Following a global effort, vaccines have also been developed for SARS-CoV-2, and currently include those from Pfizer/bioNtech, Oxford-AstraZeneca, Moderna, and Johnson & Johnson.

In some embodiments, the composition comprising the Blis product is administered before, at the same time, or after the patient is vaccinated.

Immune modulators useful in the invention include Immune modulators include budesonide (inhaled), AZD7422, azithromycin, doxycycline, tocilizumab, sarilumab, canakinumab, anakinra, baricitinib, ruxolitinib, acalabrutinib, brensocatib, ravulizumab, gemtuzumab ozogamicin, namilumab, infliximab, adalimumab, otilimab, Medi3506, leronlimab, risankizumab, lenzilumab, and IMU-838.

Well known probiotics include *Lactobacillus* spp (now known as *Lactobacillus* spp., *Limosilactobacillus* spp., *Lacticaseibacillus* spp., *Lactiplantibacillus* spp., and *Ligilactobacillus* spp.). For example: *Lactobacillus acidophilus*, *Lactobacillus salivarius* (now *Ligilactobacillus salivarius*), *Lactobacillus paracasei* (now *Lacticaseibacillus paracasei*), *Lactobacillus planatarum* (now *Lactiplantibacillus planatarum*), *Lactobacillus reuteri* (now *Limosilactobacillus reuteri*). *Lactobacillus rhamnosus* GG (how *Lacticaseibacillus rhamnosus* GG), *Saccharomyces* spp (eg *S. boulardii*, or *S. cerevisae*), *Bifidobacterium* spp (eg *B. bifidum, B. longum* or *B. lactis* Bp12) *Bacillus* spp, and *Lactococcus* spp.

Of course, streptococcal strains as discussed herein may also be administered to a host for use in the treatment of infections of the upper respiratory tract caused by streptococcal organisms, including treatment of sore throats caused mainly by *S. pyogenes*, and dental caries caused at least in part by *S. sobrinus* as detailed in WO 01/27143 for *S. salivarius* K12 and K30. WO 01/27413 details methods of treatment and products which may all be used here.

The inventors have identified that high doses of known Blis products such as BLIS K12 Throatguard™ lozenges may be useful for early intervention against LRT viral infections.

LRT viral treatment methods may also be more effective when other active agents are used.

For example, certain antimalarial compounds may be suitable for use against coronavirus including chloroquine and hydroxychloroquine and their phosphate, sulfate, and hydrochloride salt forms. These compounds may be administered to a patient in the usual way, such as by oral administration or injection.

Antiviral compounds identified as potentially useful for coronavirus treatment include favipiravir, ribavirin, EIDD- 2801, niclosamide, oseltamivir, ivermectin, umifenovir (an anti-influenza drug), remdesivir (developed for Ebola treatment), and anti-HIV drugs such as lopinavir, ritonavir or a combination thereof. Lopinavir/ritonavir, sold under the brand name Kaletra® (AbbVie, USA) among others, is a fixed dose oral combination medication for the treatment and prevention of HIV/AIDS.

Antibiotic compounds may be selected from a broad range of known antibiotics including amikacin, amoxicillin, ampicillin, azithromycin, carbenicillin, cefotaxime, ceftazidime, ceftriaxone, cefuroxime, chloramphenicol, ciprofloxacin, clindamycin, dalacin, dalfopristin, daptomycin, doxycycline, enrofloxacin, ertapenem, erythromycin, gentamicin, marbofloxacin, meropenem, metronidazole, minocycline, moxifloxacin, nafcillin, ofloxacin, oxacillin, penicillin, quinupristin, rifampin, silver sulfadiazine, sulfamethoxazole, teicoplanin, tetracycline, tobramycin, trimethoprim, vancomycin, bacitracin and polymyxin B, or a mixture thereof.

Anti-inflammatory compounds may also be useful in patients exhibiting cytokine storms resulting in hyperinflammation. Possible therapeutics include steroids such as dexamethasone, corticosteroids, hydrocortisone, immunoglobulin, cytokine blockers, and JAK inhibitors.

Anti-fungal compounds may also be useful in patients exhibiting respiratory infections and may include antibiotics (amphotericin B, natamycin and nystatin) and chemotherapeutics (mainly azoles and fluorpirymidins, pigments, chlorhexidine and chloroquinaldol).

Cytokine blockers include the IL-6 blocker—tocilizumab, and the Il-1 blocker—anakinra.

JAK inhibitors include baricitinib.

Blood thinners can also be useful for treating coronavirus, including heparin or enoxaparin.

Polymerase inhibitors may also be useful in treating coronavirus infections. Remdesivir, galidesivir and favipiravir are all examples of polymerase inhibitors currently being considered for LRT virus treatment.

Additional multi-mechanism therapeutics useful for treating an LRT, in particular SARS-CoV-2, include colchicine, dimethyl fumarate, ACE-inhibitors, statins, aspirin, clopidogrel, bemcentinib, omeprazole, famotidine, zilucoplan, vitamin C, aviptadil, opaganib, tradipitant, AZD1656, nitric oxide, razuprotafib, ruxolitinib, and fluvoxamine, proxilutamide.

As the reader will appreciate, these other active agents may be used alone or in combination with the Blis products for the prophylactic or therapeutic treatment of an LRT virus. When used in combination, a single composition comprising both, or all active agents may be produced. In other embodiments the active agents are in separate compositions, and are to be administered simultaneously, separately or sequentially. The other active agents will be administered to a patient according to their known art protocols, or protocols commonly used in the art for such active agents, and at dosages or amounts typical for such active agents.

Therapies which achieve deposition of non-viable Blis product into the LRT and URT, and colonisation in the case of viable Blis product are specifically contemplated. In some embodiments, deposition or colonisation of the URT may be accomplished according to the protocols, and using the products identified in WO 01/27143 supra. In particular, lozenges, gums, chewables, sprays (including nasal sprays), gummies, melts, candies, yoghurts, frozen yoghurts, ice cream, drinks, powders and other food products may be used to achieve colonisation of the URT. It is possible that colonisation of the URT may also result in some colonisation of the LRT.

In some embodiments, deposition into, or colonisation of the LRT with Blis products is achieved by administering an inhalable Blis product to the patient. Combination therapies comprising administration of known Blis products such as orally targeted products listed above, including lozenges, sprays (including nasal sprays), gums or powders, food products and inhalable formulations are specifically contemplated.

In the treatment of a viral infection, a Blis product can be administered to any individual susceptible to a viral infection, e.g., an LRT virus infection identified herein.

In general, the amount of a Blis product administered to the individual will be an amount effective for preventing, reducing or treating a viral infection in a host as discussed above.

A significant reduction in a virus in one embodiment may be measured by reduction in viral load.

The term "unit dose" when used in reference to a composition comprising a Blis product herein refers to physically discrete units suitable as unitary dosage for the individual, each unit containing a predetermined quantity of effective material (e.g. viable or inactivated *S. salivarius*, an extract, exudate, supernatant or an extracellular product thereof) calculated to produce the desired therapeutic effect in association with the required diluent, carrier, or excipient.

Specific dosages can vary widely according to various individual variables including size, weight, age, disease severity (e.g. the tenacity and/or viral load of the virus) and responsiveness to therapy (e.g. the susceptibility of the individual's LRT to colonisation). Methods for determining the appropriate route of administration and dosage may be determined by the consumer as they deem appropriate, or on a case-by-case basis by an attending health care professional or physician. Such determinations are routine to one of ordinary skill in the art (see for example, *Remington's Pharmaceutical Sciences*, 22nd ed., Gennaro, ed., Mack Publishing Company, Easton, Pa., 2013).

In some embodiments, where a Blis product comprising live streptococci (eg *S. salivarius*) is to be administered, then in general, the number of streptococci administered to the individual will range from about $10^2$ to $10^{15}$ bacteria, preferably from about $10^3$ to $10^{14}$ bacteria, more preferably from about $10^5$ to $10^{12}$ bacteria, normally about $10^8$ to $10^{10}$ colony forming units (CFU) per dose. One formulation employs $3.8 \times 10^9$ CFU/dose.

In some embodiments, high doses of Blis product BLIS K12 Throatguard lozenges are administered in the prodromal phase of viral infection. High doses may comprise 3-8 lozenges taken once only, or repeatedly (eg 2 to 4 times) on the same day or following days. A typical high dose protocol may comprise 4-6 lozenges of BLIS K12 Throat Guard, followed at 2-3 hour intervals, by 2 to 4 repeats (ca. 4-6 lozenges). A typical dose of *S. salivarius* in a Blis product (eg lozenge) may comprise at least 1.0, at least 1.25, at least 1.5, at least 1.75, at least 2.0, at least 2.25, at least 2.5 billion, at least 2.75, at least 3.0, at least 3.25, at least 3.5, at least 3.75, at least 4.0, at least 4.25, at least 4.5, at least 4.75, or at least 5.0 billion CFU/dose of *S. salivarius*. Accordingly, a "high dose" as used herein means 2 to 8, or 3 to 7 times, or 4 to 6 times the typical dose, taken once or repeatedly as set out above. Specific high doses may be 3 times, or 4 times, or 5 times, or 6 time, or 7 times or 8 times the typical dose. In some instances, progression of the infection is most effectively inhibited if administration is commenced at the first sign of symptoms within the prodromal period of the infection process.

Accordingly, multiple doses of the Blis product can be administered to achieve treatment of the individual, or to maintain prevention of infection. For maintenance of prevention, typical doses of Blis product may be used eg 1-2 lozenges a day.

The Blis product may need to be administered to the patient once only, or more usually repeatedly. Repeat treatments may be once a month, once a week, once a day, twice a day, three times a day, four times a day or as may otherwise be required. Conveniently, for prophylactic use, the administration may be effected by oral administration (eg of lozenges), by nasal administration (eg a spray), or by inhalation (eg a powder) of the Blis product.

Success of treatment can be measured indirectly where post-treatment levels of IFN-γ are increased, there is a reduction in cytokine response in lungs (or systemically), or inhibition of viral replication, and/or decrease in viral load. The effect should be sufficient to provide a medically significant decrease in the likelihood of a virus infection (eg a LRT virus infection), or a medically significant decrease in the severity, or length of a virus infection (eg coronavirus infection), or associated symptoms, or secondary infections.
Mode of Action Without wishing to be bound by theory, there are a number of ways in which a Blis product may act to treat or prevent LRT viral infection. Blis products have a well-recognised role in inhibiting microorganisms which can infect the upper respiratory tract. Such microorganisms include *Streptococcus pneumoniae, Streptococcus pyogenes, Haemophilus influenzae* and *Moraxella catarrhalis* amongst others. See WO 01/27143. By inhibiting these organisms using Blis products according to the known-art protocols, the Blis product may help to prevent the spread of infection by these organisms to the LRT. This may reduce or prevent secondary infections such as pneumonia associated with coronavirus infection, and therefore the patient can recover more quickly.

A Blis product may also be having an anti-inflammatory effect mediated by suppression of NF-kB activity in the lower respiratory tract. The anti-inflammatory effects of *S. salivarius* have been demonstrated in several studies since the original observation by Cousseau et al, Infection and Immunity. September 2008, p 4163-4175 76(9).

Administration of a Blis product to the LRT may therefore have the effect of quieting hyperinflammation, or cytokine storms in the lungs. This in turn can prevent or reduce lung tissue damage associated with the viral infection.

A Blis product may also increase the production of gamma interferon (IFN-γ). This may directly impact on virus viability and/or replication. Blis products may affect the activity of cytokines, e.g., by increasing interferon gamma (IFNγ) activity, or reducing NF-kB-mediated cytokine responses.

A Blis product may also act as an antiviral, e.g., by binding a virus or its cellular target (eg ACE-2 receptor) to interfere with viral attachment to, or insertion into cells, and/or viral reproduction. In some embodiments the Blis product may be in the vicinity of the cellular receptor and act as a binding decoy for the virus, lowering the amount of virus that binds to host cell receptors, and therefore the level or rate of infection.

Blis products described herein show direct action in vitro. This is very surprising as the typical mode of action for probiotics is via other mechanisms involving antagonism or host interaction. The uses and products of the invention may include any of the embodiments as set out for the method aspects as discussed above.

All references cited throughout the specification including in the Reference listing are specifically incorporated herein by reference.

Various aspects of the invention will now be illustrated in a non-limiting way by reference to the following experimental section.

EXAMPLES

Effect of K12 on Salivary IFN Levels

Materials: BLIS K12 lozenges (Throat Guard) available from Blis Technologies Limited, New Zealand.

Methodology: Dosing regime: Four adult subjects took 12 lozenges: 4 every two hours.

Saliva collection and preparation: One ml of unstimulated saliva was collected from the subjects before taking the lozenges and then at 6, 8, 10, 14 and 24 hours later. One ml of unstimulated saliva was collected from the subjects before taking the lozenges and 6, 8, 10, 14 and 24 hours later. Saliva samples were frozen until processed. Ten µl of complete protease inhibitor (Roche) was added per ml of saliva. The saliva samples were treated by adding 20 µl 2.5M NaCl and 20 µl 1.5 M sodium acetate to 200 µl of saliva. The samples were incubated on ice for 30 minutes. The saliva was then centrifuged for 5 min at 10,000 rpm, and the supernatant collected for testing
Interferon Gamma ELISA Assay Interferon gamma was detected in the saliva samples using an ELISA kit (BD Biosciences). One hundred µl of saliva sample supernatant was added to each well. The ELISA assay was conducted according to the manufacturer's protocol.
Results Interferon was not detected in the saliva samples until after 8 h. Between 22- and 139 µg of interferon gamma was detected in the 24 h samples (FIG. 1).
Conclusion During a viral infection the virus titre has been shown to increase during the first two days. An increase in the production of interferon during this time then leads to a decrease in the viral titre.

The induction of interferon gamma by ingestion of *S. salivarius* K12 may help in preventing further development of the symptoms, by reducing the viral titre.
Test of Antiviral Activity Materials Strain *S. salivarius* K12 was prepared by growth on agar medium including Columbia Agar Base (CAB) K12, CABK12+ galactose and Tryptic Soy Yeast Extract with maltodextrin (maltrin).

Product was generated by growing lawns of each strain grown on each media and incubated for 18 hours at 37° C. with 5% $CO_2$. Plates exposed to chloroform vapour for 45 mins. Aired for another 45 minutes (to kill bacteria). Two forms of product were then generated by either a) adding 5 ml Dulbecco's Modified Eagles Medium to the agar plate and left for 30 minutes. Plates were frozen at −80° C. for 24 hours. Plates were then thawed at 37° C. Bacterial liquor and cells were collected for further assays.

Or b) Collecting the chloroformed cells from the agar plate and resuspended them in PBS buffer to generate a cellular slurry.

Viral assays were to be carried out in the following media: MEM+2% FBS and 50 µg/mL gentamicin Antiviral Test:

Purpose:

To determine if the Blis product inhibits viral replication in the cell or inhibits viral spread between cells during an infection.

Brief Protocol:

Vero 76 Cells are infected with the coronavirus for approximately 1 hour, then treated with the test compound. After 3 days, cells are examined for virus-induced death.

Detailed Neutral Red Assay Protocol:

Prepare 96-well plates of the desired cell line and incubated overnight. Seed plates at a cell concentration that will yield 80-100% confluent monolayers in each well after overnight incubation.

Prepare 8 half-log, serial dilutions in MEM medium with 50 mg/mL gentamicin with the highest test Blis product concentration of 100 µg/mL.

Add 100 µL of each concentration to 5 test wells on the 96-well plate. Infect 3 wells of each dilution with the test virus in MEM+4% FBS. Add MEM+4% with no virus to 2 wells (uninfected toxicity controls).

Infect 6 wells as untreated virus controls.

Add media only to 6 wells as cell controls.

Test a known active compound M128533 in parallel as a control.

Incubate at 37° C.+5% CO2 until cytopathic effect (CPE) is apparent.

After (CPE) is observed microscopically, stain with 0.011% neutral red dye for approximately 2 hours. Siphon off neutral red dye (optionally rinse once with PBS to remove residual, unincorporated dye).

Add 200 µL 50:50 Sorensen citrate buffer/ethanol for >30 min., agitate, and read on a spectrophotometer at 540 nm.

Convert OD to percent of cell control normalizing to virus controls. Calculate $EC_{50}$ and $CC_{50}$ by regression analysis.

Expected Results:

This assay is expected to show that Blis products are able to directly inactivate, kill or prevent replication of Coronavirus growth on a cell line.

Virucidal Test:

Purpose:

To determine whether contact with the test Blis product inactivates ("kills") virus.

Materials

Blis product as above.

Brief Protocol:

Virus is to be mixed directly with the test Blis product for a given contact time. Blis product is to then be neutralized and surviving virus quantified.

Detailed Protocol:

- Prepare test compound in 2× desired test concentrations, 50 uL per tube in triplicate.
- Add 50 uL of virus solution to each tube. Use the highest titer of virus stock available.
- Incubate for the desired contact time at RT (10 seconds to 0.5 hr per sponsor request)
- Neutralize by performing a 1/10 dilution in MEM+2% FBS.
- Titer each tube by 1/10 serial dilution and adding to 4 replicate columns of 96-well plates seeded with monolayers of susceptible cells.
- Incubate plates until maximum cytopathic effect is observed and read as CPE present or not present.
- Determine virus titer by standard endpoint dilution using the Reed-Muench method (Reed, L. J.; Muench, H. (1938). "A simple method of estimating fifty percent endpoints". *The American Journal of Hygiene.* 27: 493-497.).
- Perform virus controls as above using water or other vehicle as appropriate.
- Perform toxicity controls using tubes of each Blis product without the addition of virus. Compare results to ensure that the Blis product did not confound results (false negative) by killing the cells in the absence of virus.
- For neutralization controls, repeat the toxicity control as above, but after all steps are completed, add virus to well at a low MOI that achieves full CPE. Virus should cause cytopathic effect in the presence of the test Blis product to show that residual Blis product in the virus titer assay is not masking virus present (false positive).

Expected Results:

This assay is expected to show that Blis products are able to directly inactivate, kill or prevent replication of Corona virus growth.

Test of Anti-Viral Activity of *S. Salivarius* K12 Ability:

Two Different Methods were Trialled: Virucidal and Anti-Virus Assays.

Material Preparation for Both Assays

Strain *S. salivarius* K12 was prepared by growth on agar medium including Columbia Agar Base (CAB) K12, CABCa pH 6.5+galactose (0.5%) and Tryptic Soy Yeast Extract pH 6.5 with maltodextrin (maltrin) (0.5%).

Product was generated by growing lawns of each strain grown on each media and incubated for 18 hours at 37° C. with 5% $CO_2$. Plates were exposed to chloroform vapour for 45 mins and aired for another 45 minutes (to kill bacteria). Two forms of product were then generated by either a) adding 5 ml Dulbecco's Modified Eagles Medium (Gibco) to the agar plate and left for 30 minutes. Plates were frozen at −80° C. for 24 hours. Plates were then thawed at room temperature. Bacterial liquor and cells were collected for further assays. This sample is known as the bacterial cell extract or cell exudate.

Or b) Collecting the chloroformed cells from the agar plate and resuspended them in PBS buffer to generate a cellular slurry.

Viral assays were carried out in the following media: MEM+2% FBS and 50 μg/mL gentamicin 1—Antiviral Assay:

Purpose:

To determine if the Blis product inhibits intracellular viral replication or inhibits viral spread between cells during an infection.

Brief Protocol:

Vero 76 Cells were infected with the coronavirus for approximately 1 hour, then treated with the test compound. After 3 days, the cells are examined for virus-induced death.

Detailed Neutral Red Assay:

The test samples were received frozen on dry ice and stored at −20° C. upon arrival. Prior to the assay, the Blis K12 bacterial exudate preparation (labelled A) was thawed on ice, then about 4 mL of the exudate was removed to a fresh tube and labelled A-1. The remaining 8 mL of extract was centrifuged at 5,000×g for 10 minutes and the supernatant removed to a fresh tube labelled A-2. The pelleted cell debris was then resuspended in 8 mL of test medium (Minimum Essential Medium supplemented with 5% FBS and 50 μg/mL gentamicin) and labelled A-3.

Samples A-1 and A-2 were serially diluted in test medium using 4 1:2 dilutions so that the starting (high) test concentration was 50% sample. Each dilution was added to 5 wells of a 96-well plate with 80-90% confluent Vero 76 cells. Three wells of each dilution were infected with virus, and two wells remained uninfected as toxicity controls. Six untreated wells were infected as virus controls, and six untreated wells were left uninfected to use as cell controls. Viruses were diluted to a specific 50% cell culture infectious dose (CCID50) per mL to achieve the lowest possible multiplicity of infection (MOI) that would yield >80% cytopathic effect (CPE) within 5-7 days. The protease inhibitor M128533 was tested in parallel as the positive control. Plates were incubated at 37±2° C., 5% CO2.

On day 7 post-infection (p.i.), when untreated virus control wells reached maximum CPE, the plates were stained with neutral red dye for approximately 2 hours (±15 minutes). Supernatant dye was removed, wells rinsed with PBS, and the incorporated dye was extracted in 50:50 Sorensen citrate buffer/ethanol for >30 minutes and the optical density was read on a spectrophotometer at 540 nm. Optical densities were converted to percent of cell controls and normalized to the virus control, then the effective concentration of test compound required to inhibit CPE by 50% (EC50) was calculated by regression analysis. The cell cytotoxicity concentration of compound that would cause 50% cell death in the absence of virus was similarly calculated (CC50). The selective index (SI) is the CC50 divided by EC50.

Result

| Virus | Cell line | Compound | EC50 | CC50 | SI |
|---|---|---|---|---|---|
| SARS-COV-2, USA-WA1/2020 strain | Vero76 | M128533 | <0.1 | >100 | >1000 |
| SARS-COV-2, USA-WA1/2020 strain | Vero76 | S. salivarius K12 cell exudate (A1) | 36 | >50 | >1.4 |
| SARS-COV-2, USA-WA1/2020 strain | Vero76 | S. salivarius supernatant (A2) | 7.8 | >50 | >6.4 |

Units are expressed ug/mL for M128533, % for test compounds
EC50 = 50% antiviral concentration
CC50 = 50% cytotoxic concentration of compound (no virus)

Anti-viral activity is categorised into the SI values:
0-3.9 are considered not active.
SI values 4-9.9 have minimal activity
10-49.9 are moderately active.
>50 are highly active and any compounds
>100 are indistinguishable from one another Interpretation: Supernatant from K12 cell exudate demonstrated the ability to inhibit virus growth with an SI score of 6.4

Test of Antiviral Activity and Results as Carried Out

Materials

Virus, Media and Cells
SARS-CoV-2, USA-WA1/2020 strain, virus stock was prepared prior to testing by growing in Vero 76 cells. Culture media for prepared stock (test media) was MEM with 2% fetal bovine serum (FBS) and 50 µg/mL gentamicin.

Virucidal Assay
S. salivarius exudate preparation was provided by Blis Technologies. The bacterial exudate was mixed directly with virus solution so that the final concentration was 90% of the exudate preparation and 10% virus solution. A single concentration was tested in triplicate. Test media without virus was added to one tube of the prepared compound to serve as toxicity controls. Ethanol (70%) was tested in parallel as a positive control and water only as a virus control. The solution and virus were incubated at room temperature (22±2° C.) for 30 minutes. The solution was then neutralized by a ¹⁄₁₀ dilution in MEM 2% FBS, 50 µg/mL gentamicin, 5 mg/mL sodium thiosulfate.

Virus Quantification.
Surviving virus from each sample was quantified by standard end-point dilution assay. Briefly, samples were serially diluted ¹⁄₁₀ in test medium. Then 100 µL of each dilution were plated into quadruplicate wells of 96-well plates containing 80-90% confluent Vero 76 cells. Plates were incubated at 37±2° C. with 5% CO2 for 6 days. Each well was then scored for presence or absence of virus. The titers were measured using a standard endpoint dilution 50% cell culture infectious dose (CCID50) assay and titers calculated with the Reed-Muench (1948) equation.

Results:
No direct virucidal inhibition was observed.

Viricidal Testing-1

Aim:
To assess the direct antiviral effect of S. salivarius K12 cellular exudate against the SARS-Cov2 virus.

Procedure
Virus, Media and Cells.
SARS-CoV-2, USA-WA1/2020 strain, virus stock was prepared prior to testing by growing in Vero 76 cells available from ATCC under deposit number CRL-1587. Culture media for prepared stock (test media) was Minimal Essential Media (MEM) available from Sigma Aldrich, USA with 2% fetal bovine serum (FBS) available from GE Healthcare-Hyclone and 50 µg/mL gentamicin.

Virucidal Assay.
S. salivarius K12 exudate was provided by Blis Technologies. The bacterial exudate was mixed directly with virus solution so that the final concentration was 90% of the exudate preparation and 10% virus solution. A single concentration was tested in triplicate. Test media without virus was added to one tube of the prepared compound to serve as toxicity controls. Ethanol (70%) was tested in parallel as a positive control and water only as a virus control.

The solution and virus were incubated at room temperature (22±2° C.) for 30 minutes. The solution was then neutralized by a ¹⁄₁₀ dilution in MEM 2% FBS, 50 µg/mL gentamicin, 5 mg/mL sodium thiosulfate.

Virus Quantification.
Surviving virus from each sample was quantified by standard end-point dilution assay. Briefly, samples were serially diluted ¹⁄₁₀ in test medium. Then 100 µL of each dilution were plated into quadruplicate wells of 96-well plates containing 80-90% confluent Vero 76 cells. Plates were incubated at 37±2° C. with 5% CO2 for 6 days. Each well was then scored for presence or absence of virus. The titers were measured using a standard endpoint dilution 50% cell culture infectious dose (CCID50) assay and titers calculated with the Reed-Muench (1948) equation.

Statistical Analysis.
Three independent replicates of each sample were tested, and the average and standard deviation were calculated. Results were compared with untreated controls by one-way ANOVA with Dunnett's multiple comparison tests using GraphPad Prism (version 8) software.

Controls. Virus controls were tested in water and the reduction of virus in test wells compared to virus controls were calculated as the log reduction value (LRV). Toxicity controls were tested with media not containing virus to determine if the sample was toxic to cells. Neutralization controls were tested to ensure that virus inactivation did not continue after the specified contact time, and that residual sample in the titer assay plates did not inhibit growth and detection of surviving virus. This was done by adding toxicity samples to titer test plates then spiking each well with a low amount of virus that would produce an observable amount of CPE during the incubation period.

Results:

Virus titers and LRV of SARS-CoV-2 when incubated with a single concentration of the bacterial exudate preparation A are shown in Table 1. No toxicity was observed in any of the test wells.

Viral CPE was seen in all of the toxicity control wells spiked with virus indicating that residual sample did not affect viral detection in the endpoint titer assays.

After a 30-minute contact time, the bacterial exudate did not reduce infectious virus, 4.7 compared to 4.2 log 10 CCID50 per 0.1 mL. Virus controls and positive controls performed as expected.

Virucidal Testing-2

Aim:

To assess the direct antiviral effect of S. salivarius K12 supernatant generated from the cellular exudate against the SARS-Cov2 virus Virucidal Assay.

Bacterial exudate preparations were provided by Blis Technologies frozen on dry ice and stored at −20° C. Prior to the assay, the bacterial exudate preparations were thawed on ice, centrifuged at 5,000×g for 10 minutes and the supernatant removed to a fresh tube. An aliquot of S. salivarius K12 supernatant was set aside, and the remainder 8 mL was concentrated 4× using a SpeedVac vacuum concentrator (model SVC-100H, Savant Instruments, Inc.). The 5 bacterial exudate preparations (cell exudate, supernatant of bacterial preparation A (1×), 4× concentrated supernatant of preparation S. salivarius K12 labelled A-2-1, supernatant of bacterial preparation S. salivarius M18, and supernatant of bacterial preparation S. salivarius NCTC8618) were mixed directly with virus solution so that the final concentration was 90% of the exudate preparation and 10% virus stock solution. A single concentration was tested in triplicate. Test media without virus was added to duplicate tubes of the compounds to serve as toxicity and neutralization controls. Ethanol (70%) was tested in parallel as a positive control and water only as a virus control.

The test solutions were incubated at room temperature (22±2° C.) for 30 minutes. The solution was then neutralized by a 1/10 dilution in MEM 2% FBS, 50 µg/mL gentamicin.

Results:

|  |  |  | Round 1 | Round 2 Virus titer | Log Reduction value |
|---|---|---|---|---|---|
| K12 | Cell exudate |  | 4.7 |  |  |
| K12 | Supernatant | 1× |  | 4.3 | 0 |
| K12 | Supernatant | 4× |  | 4.3 | 0 |
| Mia(M18) | Supernatant |  |  | 3.67 | 0.33 |
| NCTC8618 | Supernatant |  |  | 3.67 | 0.33 |

|  | Round 1 | Round 2 Virus titer | Log Reduction value |
|---|---|---|---|
| Ethanol | 1.1 | <0.67 | 3.33 |
| Virus control | 4.2 | 4.0 | n/a |

Interpretation:

Virus titers and LRV of SARS-CoV-2 when incubated with a single concentration of the bacterial exudate preparations are shown in 1. After a 30-minute contact time, the bacterial exudate preparations did not reduce infectious virus, 4.0 log 10 CCID50 per 0.1 mL for the virus control.

Virus controls and positive controls performed as expected. No toxicity was observed in any of the test wells.

Materials

S. salivarius strains K12, M18, and NCTC8618 were prepared by growth on agar medium including CAB, CAB+galactose and Tryptic Soy Yeast Extract with maltodextrin (maltrin).

K12, M18, and NCTC8618 3× plates of CAB K12, TSYeCa pH 6.5+maltrin (0.5%) and CABCa pH 6.5+galactose (0.5%) CABK12 prepared as per Ishijima et al Appl Environ Microbiol. 2012 April; 78(7):2190-9.

Test of Antiviral Activity 2

Materials

Various S. salivarius strains were prepared by growth on agar medium including CAB K12, CAB+galactose and Tryptic Soy Yeast Extract with maltrin (as per Antiviral 1, above). Strains tested were K12 and M18 (Mia) as detailed above and NCTC8618. NCTC8618 was included as a negative control, as it does not produce salivaricins A or B.

Five preparations s(cell exudate, the 1× supernatant of bacterial Streptococcus salivarius preparation K12 (A-2), the 4× concentrated supernatant of preparation A-2 (labelled A-2-1), and the supernatants of bacterial Streptococcus salivarius preparations of M18 (Mia) and NCTC8618 a strain available from National Collection of Type Cultures, UK were tested against severe acute respiratory syndrome coronavirus 2 (SARS-CoV-2) in a neutral red (NR) assay to evaluate inhibition of viral-induced cytopathic effects (CPE). The methodology was as previously described but with the following additional step to concentrate the K12 supernatant sample: an aliquot of sample A-2 supernatant was set aside, and the remainder (8 mL) was concentrated 4× using a SpeedVac. The sample was exposed to 60° C. heat during the concentration step, which may have resulted in denaturation of the active protein and reduced activity.

The neutral red assay was carried out as described above, with the results reported in the Table below.

| Virus | Cell line | Compound | EC50 | CC50 | SI |
|---|---|---|---|---|---|
| SARS-COV2 | Vero 76 | M128533 | 0.024 | >10 | >420 |
| SARS-COV2 | Vero 76 | K12 (A-2) | 11 | >50 | >4.5 |
| SARS-COV2 | Vero 76 | K12 (A-2-1) | 0.6 | 1.2 | 2 |
| SARS-COV2 | Vero 76 | M18 | 0.32 | 4.3 | 13 |
| SARS-COV2 | Vero 76 | NCTC8618 | >0.05 | <0.05 | 0 |

Discussion

1. Repeating the assay with the strain K12 (A-2) supernatant at 1× concentration gave findings consistent with the earlier result, with a SI index value of >4.5 (versus >6.4).

2. Concentrating the strain K12 supernatant (A-2-1) 4× did not result in a corresponding increase in potency as shown by the apparent decrease in the Selectivity index to 2. The concentration process, however, was associated with a temperature increase of the sample to about 60° C. which may have reduced antiviral activity.

3. Testing the supernatants of the agar culture extracts from the other bacteriocin producing S. salivarius strains indicated that BLIS M18 had an SI index of 13. The supernatant from S. salivarius strain NCTC8618 did not display any antiviral activity. This is consistent with its role as a negative control.

Test of Antiviral Activity 3

Aim:

The aim of this set of experiments was to determine the antiviral activity of S. salivarius strains DC0010A and Glasgow 3.

Method

Virus model set up as before.

Sample Preparation of S. salivarius DC0010A and S. salivarius Glasgow3

Supernatants of S. salivarius DC0010A and S. salivarius Glasgow3 were prepared by growing each bacterial strain on two different two agar types: TSYeCa pH 6.5+maltrin (0.5%) or human blood CAB K12 (hBaCa) agar. Strains were incubated overnight at 37° C.+5% $CO_2$ before being chloroformed for 45 minutes and air dried for a further 30 minutes. 5 ml of Dulbecco's Modified Eagles Medium (DMEM) containing 100 units/ml penicillin, 100 µg/ml streptomycin, 10 mg/ml Kanamycin and 50 µg/ml gentamycin was added to each plate and left at room temperature for 5 minutes before freezing at −80° C. overnight. Agar plates were then thawed at room temperature and the sample collected. Samples were centrifuged at 11,000 rpm for 5 mins to remove bacteria. Before beginning the assay, samples were further centrifuged 5 min at 10,000 rpm.

Results

| Virus | Cell line | Compound | EC50 | CC50 | SI |
|---|---|---|---|---|---|
| SARS-CoV-2, USA-WA1/2020 strain | Vero76 | M128533 | 0.72 | >100 | >140 |
| SARS-CoV-2, USA-WA1/2020 strain | Vero76 | S. salivarius DC0010A supernatant-grown on hBaCa agar | 2.9 | 28 | 9.7 |
| SARS-CoV-2, USA-WA1/2020 strain | Vero76 | S. salivarius DC0010A supernatant-grown on TSYECA + maltodextrose (maltrin) agar | 24 | 24 | 0 |
| SARS-CoV-2, USA-WA1/2020 strain | Vero76 | S. salivarius Glasgow3 supernatant-grown on hBaCa agar | 4.2 | >50 | >12 |
| SARS-CoV-2, USA-WA1/2020 strain | Vero76 | S. salivarius Glasgow3 supernatant-grown on TSYECA + maltodextrose (maltrin) agar | 3.5 | 20 | 5.7 |

Interpretation

S. salivarius DC0010A demonstrated anti-viral activity when grown on hBaCA agar with an SI index of 9.7. S. salivarius Glasgow3 demonstrated anti-viral activity SI indices of >12 (hBaCa) and 5.7 (TSYECa+maltodextrose (maltrin)).

Identification Information for Glasgow3, and DC0010A

| | Origin | P type | Morphology | Biochemical ID based on Biomerieux API20S |
|---|---|---|---|---|
| S. salivarius K12 | K12 from the saliva of a healthy child, New Zealand | 777 | Large round convex mucoid non-pigmented levan producing colonies on mitis salivarius agar | 99.7% S. salivarius |
| S. salivarius Glasgow3 | Glasgow3 from the saliva of a healthy child, New Zealand | 634 | Same as for K12 | 99.8% S. salivarius |
| S. salivarius DC0010A | DC0010A from the saliva of a healthy child, New Zealand | 624 | Same as for K12 | 99.9% S. salivarius |

S. salivarius K12 has anti-viral activity through secreted salivaricin We have previously determined that different media types stimulate production of varying bacteriocins from S. salivarius K12. We decided to culture K12 on agars CABCa pH 6.5+Galactose (0.5%), TSYeCa pH 6.5+Maltodextrin (Maltrin) (0.5%), and CABK12 before conducting a freeze-thaw extract protocol, to extract bacteriocins that had been secreted into media and pooling the freeze-thaw extracts (exudates) together. All cells were removed from plates and added to the freeze-thaw extract before testing. This strategy aimed to account for any anti-viral effect by secreted bacteriocins or by the bacterial cells themselves.

Samples were added directly to assays measuring viricidal (direct killing of virus) activity and anti-viral (inhibiting viral growth) activity. These assays were carried out as described above. The cell exudates were too viscous to be directly added, so samples were centrifuged. Both supernatant alone, and supernatant with resuspended cells were tested (see table below). No viricidal activity was observed from either sample; however minimal anti-viral activity was observed from the K12 supernatant.

| Assay | Strain | Sample | Result | SI Index |
|---|---|---|---|---|
| Virucidal | K12 | Exudate | No activity | N/A |
| Virucidal | K12 | Supernatant | No activity | N/A |
| Antiviral | K12 | Exudate | No activity | >1.4 |
| Antiviral | K12 | Supernatant | Minimal activity | >6.4 |

The results indicate that K12 supernatant has anti-viral activity in the freeze-thaw exudate.

We sought to confirm the results and determine the extent to which S. salivarius strains have anti-viral activity. Therefore, supernatant of freeze-thaw extracts from S. salivarius strains K12, M18, and NCTC8618 was tested for anti-viral and viricidal activity. In addition, K12 supernatant was concentrated to demonstrate any relative dose-response effect. No viricidal activity was observed in any samples, however anti-viral activity was observed in K12 and M18 supernatants, but not concentrated K12 supernatant or NCTC8618 supernatant (see table below).

| Assay | Strain | Sample | Result | SI Index | Heating |
|---|---|---|---|---|---|
| Virucidal | K12 | Supernatant | No activity | N/A | N |
| | K12 | Concentrated Supernatant | No activity | N/A | Y |
| | M18 | Supernatant | No activity | N/A | N |
| | 8618 | Supernatant | No activity | N/A | N |
| Antiviral | K12 | Supernatant | Minimal | >4.5 | N |
| | K12 | Concentrated | No activity | 2 | Y |
| | M18 | Supernatant | Moderate | 13 | N |
| | 8618 | Supernatant | No activity | 0 | N |

These results suggest that supernatant from K12 and M18 has anti-viral activity, with M18 activity higher than that of K12. Concentrated supernatant from K12 had no activity. The concentration step involved heating, which may have reduced its anti-viral activity.

S. salivarius Antiviral Activity Against SARS-CoV-2 and Influenza A

The antiviral activity of S. salivarius sample preparations were evaluated against severe acute respiratory syndrome coronavirus 2 (SARS-CoV-2) and Influenza A virus H3N2 in neutral red (NR) assays to evaluate inhibition of viral-induced cytopathic effect (CPE).

Neutral red assay: Samples were received frozen on dry ice and stored at −20° C. upon arrival. All 10 samples were serially diluted in test medium using 4 1:2 dilutions so that the starting (high) test concentration was 50% sample. Each dilution was added to 5 wells of a 96-well plate with 80-90% confluent Vero 76 (SARS-CoV-2) or MDCK (Influenza) cells.

Three wells of each dilution were infected with virus, and two wells remained uninfected as toxicity controls. On each plate, six untreated wells were infected as virus controls, and six untreated wells were left uninfected to use as cell controls.

Viruses were diluted to a specific 50% cell culture infectious dose (CCID50) per mL to achieve the lowest possible multiplicity of infection (MOI) that would yield >80% cytopathic effect (CPE) within 3-5 days.

The protease inhibitor M128533 was tested in parallel as the positive control in the SARS-CoV-2 assay and ribavirin in the influenza assay.

Plates were incubated at 37±2° C., 5% CO2. On day 3 or 4 post-infection (p.i.), when untreated virus control wells reached maximum CPE, the plates were stained with neutral red dye for approximately 2 hours (15 minutes).

Supernatant dye was removed, wells rinsed with PBS, and the incorporated dye was extracted in 50:50 Sorensen citrate buffer/ethanol for >30 minutes and the optical density was read on a spectrophotometer at 540 nm. Optical densities were converted to percent of cell controls and normalized to the virus control, then the effective concentration of test compound required to inhibit CPE by 50% (EC50) was calculated by regression analysis. The cell cytotoxicity concentration of compound that would cause 50% cell death in the absence of virus was similarly calculated (CC50). The selective index (SI) is the CC50 divided by EC50.

Results

The SI values are summarized in the tables below as indicated. SI values between 0-3.9 are considered not active. SI values 4-9.9 have minimal activity and SI of 10-49.9 are moderately active. SI values >50 are highly active and any compounds with SI values >100 are indistinguishable from one another. The positive controls and the virus controls performed as expected.

| Virus | Cell line | Strain | Resuspension medium | Time to produce antiviral activity | SI Index |
|---|---|---|---|---|---|
| SARS-CoV-2 | Vero | M128533 | | | >320 |
| | | M18 | DMEM | 6 | 1.2 |
| | | M18 | RPMI | 6 | 0 |
| | | M18 | DMEM | 17 | 0 |
| | | M18 | RPMI | 17 | 0 |
| | | K12 | DMEM | 6 | 0 |
| | | K12 | RPMI | 6 | 1.3 |
| | | K12 | DMEM | 17 | 1.9 |
| | | K12 | RPMI | 17 | >2.1 |

| Virus | Cell line | Strain | Resuspension medium | Time to produce antiviral activity | SI Index |
|---|---|---|---|---|---|
| H3N2 | MDCK | Ribavirin | | | >590 |
| | | M18 | DMEM | 6 | 0 |
| | | K12 | DMEM | 6 | >4.2 |

The results show that K12 has minimal activity against Influenza A.

S. salivarius Antiviral Activity Against RSV and Influenza B

K12 and M18 were tested for in vitro antiviral activity against RSV (A2 strain) and influenza B (Brisbane/60/2008 strain).

Samples were serially diluted using four 2-fold dilutions in media so that the starting (high) test concentration was 50%. Media for MDCK cells included DMEM+10 U/ml trypsin+1 ug/mL EDTA. Each dilution was added to 5 wells of a 96-well plate with 80-100% confluent cells. Three wells of each dilution were infected with virus, and two wells remained uninfected as toxicity controls. Six wells were infected and untreated as virus controls, and six wells were uninfected and untreated as cell controls. A positive control compound, ribavirin, was tested in parallel. Plates were incubated at 37±2° C., 5% $CO_2$.

Once untreated virus control wells reached maximum CPE on the day indicated in the table below, plates were stained with neutral red dye for approximately 2 hours (±15 minutes). Supernatant dye was removed and wells rinsed with PBS, and the incorporated dye was extracted in 50:50 Sorensen citrate buffer/ethanol for >30 minutes and the optical density was read on a spectrophotometer at 540 nm.

Optical densities were converted to percent of cell controls and normalized to the virus control, then the concentration of test compound required to inhibit CPE by 50% ($EC_{50}$) was calculated by regression analysis. The concentration of compound that would cause 50% cell death in the absence of virus was similarly calculated ($CC_{50}$). The selective index (SI) is the $CC_{50}$ divided by $EC_{50}$.

| Virus | Cell line | Strain | Media | Max CPE day | SI Index |
|---|---|---|---|---|---|
| RSV | MA-104 | Ribavirin | DMEM | 6 | 14 |
| | | K12 | DMEM | 6 | >4.6 |
| | | M18 | DMEM | 6 | 8 |

-continued

| Virus | Cell line | Strain | Media | Max CPE day | SI Index |
|---|---|---|---|---|---|
| Influenza B | MDCK | Ribavirin | DMEM + trypsin + EDTA | 3 | >320 |
| | | K12 | DMEM + trypsin + EDTA | 3 | >5.4 |
| | | M18 | DMEM + trypsin + EDTA | 3 | 2.8 |

The results show that K12 and M18 have minimal activity against RSV, and that K12 has minimal activity against influenza B.

Observational Experiment

Inventor Tagg (and his wife) have trialled early interventions of episodes of viral infection of the lower and upper respiratory tract by taking high dose BLIS K12 throat Guard (typically 6 lozenges of BLIS K12 Throat Guard followed 2-3 hours later by a repeat (ca. 6 lozenge). Progression of the infection was most effective if commenced at the first sign of symptoms within the prodromal period of the infection process. Since swabs taken of the throat at this time showed no evidence of bacterial pharyngitis (e.g. due to *S. pyogenes*) the inventor concluded that the intervention was due to interference with the typical progression of a seasonal virus infection (most typically, the "common cold"—of Coronavirus etiology). As a result of this treatment, infections have reduced to no more than one annually for both subjects. The number of successful interventions annually over the past few years for these two subjects has ranged from 3 to 6.

Based on this experimental work, Blis products, may provide an alternative therapy for the prevention, reduction or treatment of virus infection, such as a LRT virus infection, particularly a coronavirus infection.

INDUSTRIAL APPLICATION

Blis products are believed to be effective against viruses including LRT viruses such as coronavirus, and in particular SARS-CoV-2.

This is surprising where generally *S. salivarius* strains are thought to be primarily active against closely related aerobic bacteria and some anaerobic bacteria. LRT viruses, such as coronavirus, occupy a niche in the lungs that can also be accessed by *S. salivarius*, The Blis products herein therefore have application in methods of prophylactically or therapeutically treating individuals against the harmful effects at least of some LRT infections, or the symptoms or secondary infections associated with such infections. These methods include treatment or prevention of infection in which a LRT virus, such as coronavirus, is the primary causative agent.

Combination therapies with two or more *S. salivarius* strains identified herein to achieve deposition in, or colonisation of the LRT by Blis products are contemplated.

It will be appreciated that the above description is provided by way of example only and that variations in both the materials and techniques used which are known to those persons skilled in the art are contemplated.

The invention claimed is:

1. A method for a prophylactic or therapeutic treatment of a lower respiratory tract (LRT) virus infection in a patient in need thereof, the method comprising administering to said patient an effective amount of a Blis product,
   wherein the LRT virus is selected from the group consisting of influenza A, influenza B, respiratory syncytial virus (RSV), and coronavirus, and
   wherein the Blis product is selected from the group consisting of *S. salivarius* strain K12, *S. salivarius* strain M18, *S. salivarius* strain DC0010A, *S. salivarius* strain Glasgow 3, exudates thereof, extracts thereof, and supernatants thereof.

2. The method according to claim 1, wherein the LRT virus is influenza A H1N1 or H3N2.

3. The method according to claim 1, wherein the LRT virus is influenza B Brisbane/60/2008.

4. The method according to claim 1, wherein the LRT virus is RSV A2.

5. The method according to claim 1, wherein the LRT virus is a coronavirus.

6. The method according to claim 5, wherein the coronavirus is a human coronavirus selected from the group consisting of SARS-CoV (2003), HCoV NL63 (2004), HKU1 (2005), MERS-CoV (2012), SARS-CoV-2 (2019), and variants thereof.

7. The method according to claim 5, wherein the coronavirus is SARS-CoV-2 (Covid-19) or a variant thereof.

8. The method according to claim 1, wherein the Blis product is in the form of a composition which further comprises a pharmaceutically acceptable diluent, carrier and/or excipient.

9. The method according to claim 8, wherein the composition is in the form of an inhalable composition, spray, nasal spray, lozenge, gum, capsule, powder, melt, food product, confectionary, or chewable.

10. The method according to claim 8, wherein the composition is in a form for administration via an inhaler, nebuliser, or atomiser.

11. The method according to claim 8, wherein the composition is in unit dosage form.

12. The method according to claim 1, wherein the method further comprises administering one or more other active agents.

13. The method according to claim 12, wherein the other active agent(s) are selected from the group consisting of antibodies, vaccines, immune modulators, probiotics, antimalarial compounds, antiviral compounds, antibiotic compounds, anti-inflammatory compounds and polymerase inhibitors.

14. The method according to claim 13, wherein the antimalarial compounds are selected from the group consisting of chloroquine and hydroxychloroquine.

15. The method according to claim 13, wherein the antiviral compounds are selected from the group consisting of lopinavir, ritonavir or a combination thereof.

16. The method according to claim 13, wherein the antibiotic compounds are selected from the group consisting of amikacin, amoxicillin, ampicillin, azithromycin, carbenicillin, cefotaxime, ceftazidime, ceftriaxone, cefuroxime, chloramphenicol, ciprofloxacin, clindamycin, dalacin, dalfopristin, daptomycin, doxycycline, enrofloxacin, ertapenem, erythromycin, gentamicin, marbofloxacin, meropenem, metronidazole, minocycline, moxifloxacin, nafcillin, ofloxacin, oxacillin, penicillin, quinupristin, rifampin, silver sulfadiazine, sulfamethoxazole, teicoplanin, tetracycline, tobramycin, trimethoprim, vancomycin, bacitracin, polymyxin B, and mixtures thereof.

17. The method according to claim 1 wherein a high dose of *S. salivarius* is administered to said patient 1 to 4 times a day.

18. The method according to claim 13, wherein the anti-inflammatory compounds are selected from steroids, immunoglobulin, cytokine blockers, and JAK inhibitors.

19. The method according to claim 13, wherein the polymerase inhibitors are selected from remdesivir, galidesivir and favipiravir.

20. The method according to claim 13, wherein the antibodies are selected from bamlanivimab, casirivimab, etesevimab, VIR 7831, REGEN-COV and imdevimab, and combinations thereof.

21. The method according to claim 13, wherein the vaccines comprise a SARS CoV-2 vaccine.

22. The method according to claim 13, wherein the immune modulators are selected from budesonide (inhaled), AZD7422, azithromycin, doxycycline, tocilizumab, sarilumab, canakinumab, anakinra, baricitinib, ruxolitinib, acalabrutinib, brensocatib, ravulizumab, gemtuzumab ozogamicin, namilumab, infliximab, adalimumab, otilimab, Medi3506, leronlimab, risankizumab, lenzilumab, and IMU-838.

* * * * *